(12) United States Patent
Conlon

(10) Patent No.: US 8,564,832 B2
(45) Date of Patent: Oct. 22, 2013

(54) IMAGE OPERATIONS USING FRAME-BASED COORDINATE SPACE TRANSFORMATIONS OF IMAGE DATA IN A DIGITAL IMAGING SYSTEM

(75) Inventor: Paul Roberts Conlon, South Bristol, NY (US)

(73) Assignee: Xerox Corporation, Norwalk, CT (US)

( * ) Notice: Subject to any disclaimer, the term of this patent is extended or adjusted under 35 U.S.C. 154(b) by 345 days.

(21) Appl. No.: 13/155,723

(22) Filed: Jun. 8, 2011

(65) Prior Publication Data

US 2012/0314230 A1 Dec. 13, 2012

(51) Int. Cl.
G06F 15/00 (2006.01)
G06K 1/00 (2006.01)
H04N 1/46 (2006.01)
G03F 3/08 (2006.01)
G09G 5/02 (2006.01)

(52) U.S. Cl.
USPC ............. 358/1.9; 358/1.2; 358/504; 358/518; 345/589; 345/590

(58) Field of Classification Search
USPC ............. 358/1.9, 1.2, 504, 518; 345/589, 590
See application file for complete search history.

(56) References Cited

U.S. PATENT DOCUMENTS

| 7,847,986 B2 * | 12/2010 | Starkweather | ................ 358/504 |
| 7,951,110 B2 | 5/2011 | Bishop et al. | |
| 2003/0184557 A1 * | 10/2003 | Wen | ............................... 345/590 |
| 2010/0156940 A1 | 6/2010 | Fan et al. | |
| 2011/0109918 A1 | 5/2011 | Conlon et al. | |
| 2011/0109919 A1 * | 5/2011 | Conlon et al. | ................. 358/1.2 |
| 2012/0007877 A1 * | 1/2012 | Butler | ............................ 345/589 |
| 2012/0307264 A1 * | 12/2012 | Arregui et al. | ................. 358/1.9 |

OTHER PUBLICATIONS

Adobe Systems Incorporated, "TIFF Revision 6.0", Jun. 3, 1992, pp. 1-121, Mountain View, CA.

* cited by examiner

*Primary Examiner* — Charlotte M Baker
(74) *Attorney, Agent, or Firm* — Philip E. Blair; Fleit Gibbons Gutman Bongini & Bianco P.L.

(57) ABSTRACT

What is provided are a system and method which enables users to configure their respective imaging devices to receive image data in a first coordinate space and map the received data to a second coordinate space for subsequent processing. In such a manner, users or key operators can configure their imaging device to transform image data to any desired orientation for processing across any imaging device. Preset configuration in the imaging device can be setup at the factory or installed in the field for desired behavior. Furthermore, the preset configurations can be used to correct problems with jobs in the field. A simple user interface (UI) addition to the digital front end (DFE) describe below provides operator selection. The operator can emulate current customer workflow across a variety of imaging devices for both intra-brand and inter-brand reduces any impact on legacy work flows. Various embodiments are disclosed.

18 Claims, 24 Drawing Sheets

| FIGURE | ITEM | 2D GRAPHIC | 2D CCM | 3D GRAPHIC | 3D CCM |
|---|---|---|---|---|---|
| | | | CCM2D00XxYy | | CCM3D00XxYyZz |
| 300 | 302 | | $\begin{pmatrix} 1 & 0 & 0 \\ 0 & 1 & 0 \\ 0 & 0 & 1 \end{pmatrix}$ | | $\begin{pmatrix} 1 & 0 & 0 & 0 \\ 0 & 1 & 0 & 0 \\ 0 & 0 & 1 & 0 \\ 0 & 0 & 0 & 1 \end{pmatrix}$ |
| | | | CCM2D01XxYy | | CCM3D01XxYyZz |
| 300 | 304 | | $\begin{pmatrix} -1 & 0 & 0 \\ 0 & 1 & 0 \\ 0 & 0 & 1 \end{pmatrix}$ | | $\begin{pmatrix} -1 & 0 & 0 & 1 \\ 0 & 1 & 0 & 0 \\ 0 & 0 & 1 & 0 \\ 0 & 0 & 0 & 1 \end{pmatrix}$ |
| | | | CCM2D03XxYy | | CCM3D03XxYyZz |
| 300 | 306 | | $\begin{pmatrix} -1 & 0 & 0 \\ 0 & -1 & 0 \\ 0 & 0 & 1 \end{pmatrix}$ | | $\begin{pmatrix} -1 & 0 & 0 & 1 \\ 0 & -1 & 0 & 1 \\ 0 & 0 & 1 & 0 \\ 0 & 0 & 0 & 1 \end{pmatrix}$ |
| | | | CCM2D02XxYy | | CCM3D02XxYyZz |
| 300 | 308 | | $\begin{pmatrix} 1 & 0 & 0 \\ 0 & -1 & 0 \\ 0 & 0 & 1 \end{pmatrix}$ | | $\begin{pmatrix} 1 & 0 & 0 & 0 \\ 0 & -1 & 0 & 1 \\ 0 & 0 & 1 & 0 \\ 0 & 0 & 0 & 1 \end{pmatrix}$ |
| | | | CCM2D00XyYx | | CCM3D00XyYxZz |
| 400 | 402 | | $\begin{pmatrix} 0 & 1 & 0 \\ 1 & 0 & 0 \\ 0 & 0 & 1 \end{pmatrix}$ | | $\begin{pmatrix} 0 & 1 & 0 & 0 \\ 1 & 0 & 0 & 0 \\ 0 & 0 & 1 & 0 \\ 0 & 0 & 0 & 1 \end{pmatrix}$ |
| | | | CCM2D01XyYx | | CCM3D01XyYxZz |
| 400 | 404 | | $\begin{pmatrix} 0 & 1 & 0 \\ -1 & 0 & 0 \\ 0 & 0 & 1 \end{pmatrix}$ | | $\begin{pmatrix} 0 & 1 & 0 & 0 \\ -1 & 0 & 0 & 1 \\ 0 & 0 & 1 & 0 \\ 0 & 0 & 0 & 1 \end{pmatrix}$ |
| | | | CCM2D03XyYx | | CCM3D03XyYxZz |
| 400 | 406 | | $\begin{pmatrix} 0 & -1 & 0 \\ -1 & 0 & 0 \\ 0 & 0 & 1 \end{pmatrix}$ | | $\begin{pmatrix} 0 & -1 & 0 & 1 \\ -1 & 0 & 0 & 1 \\ 0 & 0 & 1 & 0 \\ 0 & 0 & 0 & 1 \end{pmatrix}$ |
| | | | CCM2D02XyYx | | CCM3D02XyYxZz |
| 400 | 408 | | $\begin{pmatrix} 0 & -1 & 0 \\ 1 & 0 & 0 \\ 0 & 0 & 1 \end{pmatrix}$ | | $\begin{pmatrix} 0 & -1 & 0 & 1 \\ 1 & 0 & 0 & 0 \\ 0 & 0 & 1 & 0 \\ 0 & 0 & 0 & 1 \end{pmatrix}$ |

FIG. 5

| SOURCE FOREGROUND OBJECT (ROW) & SOURCE BACKGROUND FRAME OBJECTS (COL) | IMAGE | IMAGEABLE SUBSTRATE | IMAGE PROCESSING CARD | RASTER OUTPUT SYSTEM | PAPER PATH | FINISHER | SCANNER |
|---|---|---|---|---|---|---|---|
| IMAGE | x | x | x | x | | x | x |
| IMAGEABLE SUBSTRATE | | x | x | x | x | x | x |
| IMAGE PROCESSING CARD | x | x | x | x | | | x |
| RASTER OUTPUT SYSTEM | | | x | x | x | x | x |
| PAPER PATH | | | | x | x | x | x |
| FINISHER | | | | x | x | x | |
| SCANNER | | | x | x | x | | |

FIG. 9

IMAGE OPERATIONS USING FRAME-BASED COORDINATE SPACE TRANSFORMATIONS OF IMAGE DATA IN A DIGITAL IMAGING SYSTEM

TECHNICAL FIELD

The present invention is directed to systems and methods for imaging operations including device scaling, translation, reflecting, and rotation of frame-based image data across differing coordinate spaces and the emulation thereof in a digital imaging device.

BACKGROUND

Imaging jobs in imaging systems including printers, facsimile machines, and scanners are used to define operations such as scaling, translation, mirroring or reflecting, and rotation. Different imaging devices behave differently. This different behavior many times occurs across imaging devices from the same manufacturer. The order-of-operation scaling, translation, reflecting, and rotation is noncommutative across devices. Stated differently, if the order of a set of transformation changes, the end results are typically different. Frequently, only through an iterative trial and error process, a user will get an imaging job to run as desired. This inconsistent behavior of imaging devices is even more acute with devices from different manufacturers. One example of an imaging device is a multifunction device (MFD). The MFD is an office or light production machine which incorporates the functionality of multiple devices in one. This multiple functionality includes printing, scanning, faxing, viewing and copying. MFDs provide a smaller footprint as well as centralized document management, document distribution and document production in a large-office setting Many times devices or fleets of devices, even from the same manufacturer, often use different origins and coordinate spaces from system to system for images, sheets, and devices including image processors, mechanical, scanning and xerographic sub-systems. Imaging operations such as device scaling, translation, reflecting, rotation and edge erase are relative to a coordinate space (in particular to its origin) so behavior can and often will be different across MFD models. Scanners will often have varying origins and scanning directions so saving scanned images may give inconsistent visual image to raster image orientations. Print and Copy/Scan sometimes use different orientations as well, resulting in different results for each path (often unintentionally and undesirable). For example, scaling is relative to origin, so scaling down or up (reduce/enlarge) may result in different image registration or clipping regions. Origins and order of operation are often fixed on a device, not allowing the user to select a different origin (i.e., a particular corner, the center, or an arbitrary point in the imaging frame) or order of operation. MFDs may possibly rotate in either clockwise or counter clockwise directions.

Origins can be further differentiated to be relative to input or output "spaces". More generally these spaces are vector spaces. For most purposes herein the terms "space", "coordinate space" and "vector space" may be used interchangeably. For example, a RIPped or Copy/Scan input origin might be lower right, whereas the user may want to register to an upper left corner of the sheet and perform imaging operations relative to that origin. The challenge is to provide a framework to allow MFDs to conform to a user-definable or selectable set of behaviors. Since a device will typically have a fixed set of capability, algorithms to emulate any desired behavior would give more flexibility to the user, and to allow a suite of varying devices to behave consistently. Behaviors could be defined for a given job, or configured by an administrator as part of a policy used across all jobs. Decoupling user experience from device behavior gives additional flexibility to engineering designs and component choices. FIG. 1 illustrates, by way of example, a front top perspective of two models of MFDs, each with different origins and different coordinate space. Origin 104 is at the lower left corner on platen 115 of a Model A machine. Origin 154 is at the upper right corner on platen 165 of Model B machine. The Xerox Logo is used to easily understand the different coordinate spaces along with their unique origins.

Accordingly, what is needed in this art are increasingly sophisticated systems and methods for transforming coordinates from a first coordinate space to a second coordinate space in an imaging device.

INCORPORATED REFERENCES

The following U.S. patents, U.S. patent applications, and Publications are incorporated herein in their entirety by reference.

"Frame-Based Coordinate Space Transformations Of Graphical Image Data In An Image Processing System", by Paul R. Conlon, U.S. patent application Ser. No. 13/155,756, filed concurrently herewith.

"Method And System For Utilizing Transformation Matrices To Process Rasterized Image Data", by Fan et al., U.S. patent application Ser. No. 12/339,148, filed: Dec. 18, 2008.

"Controlling Placement And Minimizing Distortion Of Images In An Imaging Device", by Conlon et al., U.S. patent application Ser. No. 12/614,673, filed: Nov. 9, 2009.

"Architecture For Controlling Placement And Minimizing Distortion Of Images", by Conlon et al., U.S. patent application Ser. No. 12/614,715, filed: Nov. 9, 2009.

BRIEF SUMMARY

What is provided are a novel system and method for transforming graphics coordinates between different models of imaging devices. Using the present method, a user can readily configure their imaging devices to transform coordinates from a first coordinate space to a second coordinate space in an imaging device. An implementation hereof enables a user to configure their imaging system to transform image data to any desired processing orientation. The present frame-based coordinate transformation method allows key operators to standardize all their multifunction devices to receive image data using, for example, an upper-left registration orientation and a specific order-of-operation (OOO). Standardized behavior is important because order-of-operation e.g., combining scaling, translation, reflecting, and rotation operations, is noncommutative. Therefore different operation orderings produce different results. The teachings hereof provides customers and manufacturers the ability to define and emulate various order-of-operation behaviors despite restrictions, and provides better consistency for image data across imaging processing devices. Better consistency is enabled, i.e., consistency between two manufacturers of imaging devices or between the same manufacturer of two imaging devices. By providing inter-brand and intra-brand consistency, costs relating to training and operator error, and field problems can be reduced while increasing customer satisfaction. Moreover, the present system and method are backward compatible with existing imaging devices.

In one example embodiment, the present method for transforming graphics coordinates between different models of imaging devices involves the following. First, a source coordinate space with an origin and at least two axes for a source system is defined. Coordinates and/or dimensions and locations of each of a source foreground object and a source background frame object are received. A target coordinate space with an origin and at least two axis for a target system are received. A mapping using at least one Coordinate Change Matrix (CCM) is selected for mapping between the source coordinate space and the target coordinate space. A transformation is then applied to modify the source foreground object relative to the source coordinate space. This transformation produces transformed source foreground object coordinates. The source foreground object coordinates are captured to obtain the foreground object final positioning offset and transformed object offset via the CCM mapping to a target foreground object offset. The transformed source foreground object coordinates are clipped to the coordinates of the source frame object to create clipped transformed source foreground object coordinates. An inverse transformation is applied to the clipped transformed source foreground object coordinates to create a source clipping rectangle. The source clipping rectangle and the source background frame object are then mapped using the CCM to the target coordinates to create a target clipping rectangle and a target frame object in the target coordinate space. Once the transformation for the above method is derived, the transformation can be applied to the actual image data. The transformation includes scaling, translation, reflecting, and rotation of the actual image data. Various embodiments are disclosed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which:

FIG. 5 is a table of Coordinate Change Matrices (CCM) used for mapping from a first coordinate space to a second coordinate space;

FIG. 9 is a table showing possible pairs of source foreground objects and source background frame objects;

DETAILED DESCRIPTION

Figure 1:
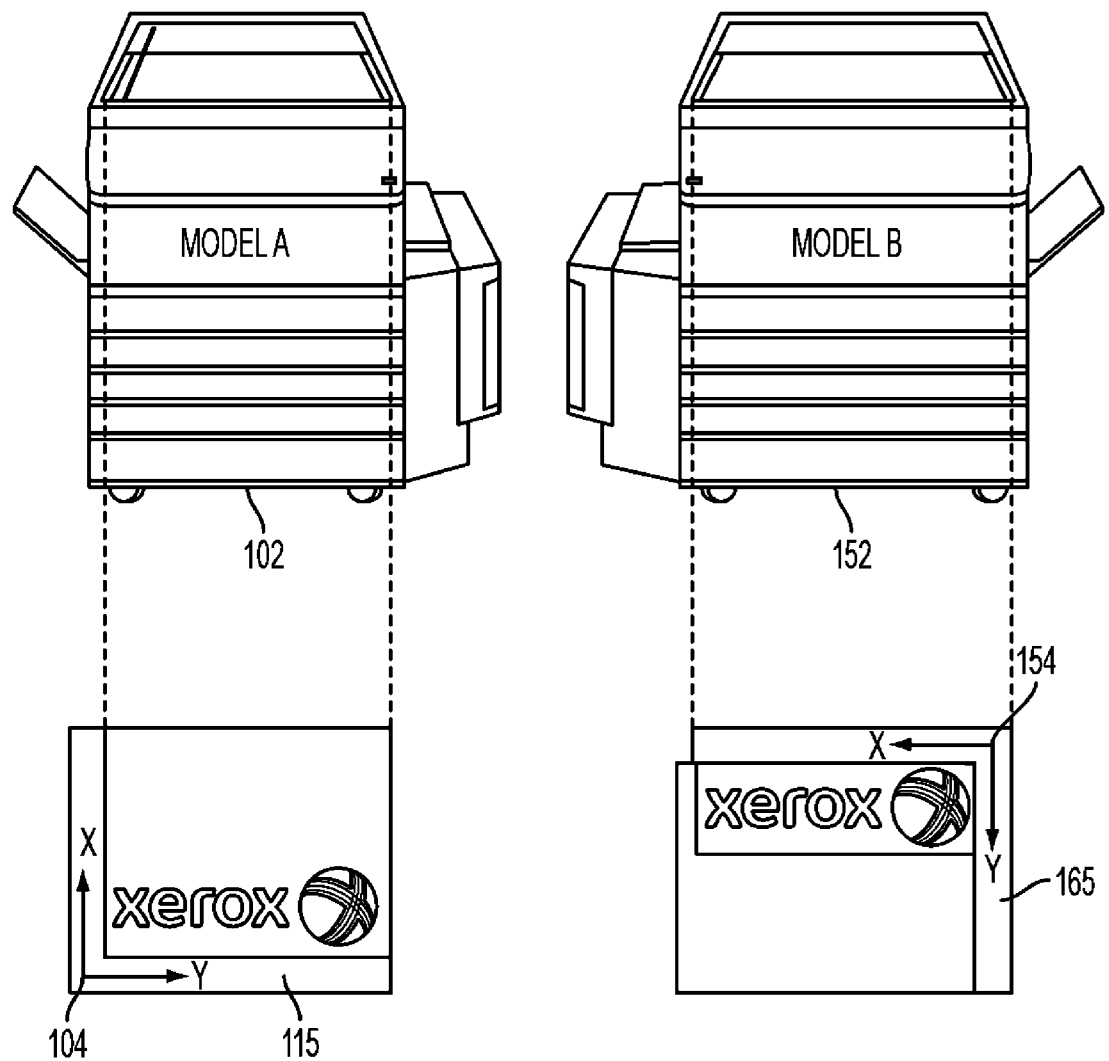
FIG. 1 is a front top perspective view of two model multifunction devices (MFDs) each having different origins and coordinate spaces.

What is provided are a system and method which enables users to configure their respective imaging devices to receive image data in a first coordinate space and map the received data to a second coordinate space for subsequent processing.
Non-Limiting Definitions A "canonical coordinate space" is a coordinate space that is independent of the coordinates from both a source image processing device or a target image processing device. For simplicity, an example of a canonical coordinate space used in the present method and system, has the origin offset set to zero, i.e., {0,0,0} on a 3D Cartesian coordinate system. The canonical coordinate space mapping uses a canonical matrix form which is functionally equivalent to the identity matrix. Although all the mathematical operations hereof are shown in 3D, it should be appreciated that these same mathematical operations are equally applicable to 2D which is the primary dimensionality for many document imaging system applications "Clipping" is the process of using a frame or clipping window generically as a bounding box on an image to produce an image that is trimmed or clipped to the shape of the bounding box. Clipping is also known and described in the arts as "cropping". For purposes herein the terms may be used interchangeably.

A "Coordinate Change Matrix" (CCM), also known as a "change of basis matrix", in the 2D context, is one of eight predefined matrix operations for a 2D coordinate space as shown in FIG. 5. Other predefined matrix operations may be used for a 3D coordinate space. It is important to note that the matrix in FIG. 5 are unscaled matrices, i.e., the origins are still based on a unit cube. Likewise for a 2D coordinate space, origins are based on a rectangular region such as a unit square. The translation is from a unit square to an actual corner. Therefore, this is a starting place but as will become evident herein further, the origin is changed to reflect the actual object corner locations relative to the original unit object (cube or square) origin. This creates a rectangular space where coordinates and functions may be mapped or changed.

A "coordinate space" refers to a 2D or 3D rectangular coordinate system, such as a standard Cartesian coordinate system. Each coordinate space has a unique origin where two or more of the axes intersect. The coordinate space is not limited to rectangular (orthogonal) coordinate systems.

A "device level transformation" is an operation, such as scaling, translation, mirroring or reflecting, and rotation, on image data typically not initiated by a user or customer but rather in response to handling differences between two image processing devices. For example, printing image data on a second device when the image data is setup for a first device. In this instance, it is often desirable to avoid printing edges because toner fouls the paper path. To avoid this, the image is scaled to 98% and centered when printing the image data on the second device. Device level transformations can be performed by itself or in conjunction with user-interface level transformations. Device level transformations can also be performed by in conjunction with device level transformations of other emulated devices.

"Emulation" is the process of imitating an order-of-operation specific behavior on a particular imaging system that enables it to do the same work, run the same production jobs/tickets, as another imaging system. The process of emulation can be carried out in software, and/or hardware or a special purpose computer processing system configured to perform emulation as defined herein.

A "frame" or "clipping window" or "clipping region" are used generically to refer to a bounding box (2D) or bounding region (3D). A 2D frame includes, but is not limited to, an area of a rectangular sheet or simply an image. A 3-D frame is a volume. The frame can be any geometric shape, although frames are typically rectangular. A frame is a general concept that can be consistently applied to a variety of situations in document imaging systems. One corner of a frame is typically anchored to an origin. For example, a positive value in a first quadrant is typically referenced with rectangular coordinates. A source background frame object such as a rectangular region is an instance of a frame. The source background frame object is also referred to as a canvas in an imaging context. The source background object may correspond to a region on an image, an imageable substrate, a scanner, and a raster output system. It should be appreciated that the techniques in the present method and system are readily extendable to 3D space. In the 3D case, Z simply becomes non-zero and the use of a 3D affine form (i.e., a homogeneous form) for the data points is possible. Common examples would include the orientation of a device or sheet which would have either a face up or face down physical orientation. Likewise, image, paper, or device paths may have a Z-axis orientation component.

A "foreground source object" is any geometric region to be placed on an imageable framed area (i.e. background area), such as a sheet, to which a clipping window is applied. For example, if an image is scaled off the sheet, this is the foreground source object and subsequently the image is clipped to the frame imageable. Note that in many cases this ordering will be visually obvious. However, in the case of layered images, the foreground and background images may be blended together making this distinction less obvious.

A "forward coordinate change mapping" is where the set of points $P_S$ is associated with the source vector space S and the set of points $P_T$ is associated with the target vector space T. Within-device or within-UI mappings for operations such as rotation, scaling, translation and reflecting are relative to the particular device coordinate spaces (mappings are within-space). During emulation, mappings must be done between differing devices or UIs. Mapping in this case are across-spaces, which require coordinate change mappings from a source space to a target space.

An "inverse" (or 'backward') coordinate change mapping" is where the set of points $P_S$ is associated with the source vector space S and the set of points $P_T$ is associated with the target vector space T. There is still abstractly a mapping between a source vector space to a target vector space, but the order of mapping or relation is reversed because the spaces are reversed. As above, the coordinate change mapping is across-spaces. Note that such mappings also apply to functions, and the technique is more generally called change of basis.

"Order-of-Operation" (OOO) refers to transformation operations such as scaling, translation, reflecting, and/or rotation which are non-commutative, that is, changing the order of each transformation in a set of transformations changes the results and behaviors.

A "source background frame object" is an instance of a frame as applied to a source background object. The source background object may correspond to a region on an image, an imageable substrate, a scanner, a raster output system, or a paper path.

A "source foreground object" is any geometric region commonly logically placed upon a framed area, such as a sheet. During transformation operations as scaling up when the source background object no longer fits within the imageable framed area, the source background object is typically cropped by a logical application of a clipping window. Rectangular regions are commonly used and applied to an image, an imageable substrate, a scanner, a raster output system, a paper path, a finisher, or an imaging processing card.

"Special scaling" is a technique applied to a unit square or unit cube to translate the canonical unit origin locations to reflect an actual object (frame, sheet, clipping window, image and the like). It is not related to the typical graphics scaling operation used in devices but as a metaphor of stretching a unit object to the size of an actual object. For example, scaling a unit square to the size of a sheet. In essence it modifies the origin offsets by changing the translation component of a CCM and is done simply in an enabling software function.

"Target coordinate space" is a coordinate space to which the set of source objects (foreground/background frame objects, coordinates, offsets, clipping windows, etc.) are to be mapped. It reflects the coordinate space in a target UI and/or device. In this application all coordinate spaces are frame-based coordinate spaces.

A "transformation operation" or "transform" as used herein refers to a mathematical operation to map within a coordinate space and/or between distinct coordinate spaces. Specific transformation are scaling, translation, reflecting, and rotation. In one embodiment, the transformation operation itself is the matrix multiplication of one or more of the preselected Coordinate Change Matrices applied to the matrix of image data, converted either to or from an intermediate canonical coordinate space. The transformation can use forward or inverse predefined Coordinate Change Matrices.

"User Interface (UI) Level Transformation" is an operation performed by an operator or user through a user interface. Such operations include, for instance, scaling, translation, reflecting, and rotation, on image data. For example, a user wants to scale the image by 50% or maybe 150% overall. Another example might be scale-to-paper-size in response to a user selection. A UI Level Transformation can be performed by itself or in conjunction with device level transformations. It should be appreciated that the teachings hereof can be decoupled of any UI-level and device level operations. Today device level behavior typically dictates the UI-level behavior, resulting in an inflexible and inconsistent customer experience at the fleet level.

An "image", as used herein, refers to a spatial pattern of physical light comprised of known colors of the light spectrum which are visible by the human eye. When reduced to capture or rendering, the image generally comprises a plurality of colored pixels. A printed image (or image print) would be a photograph, plot, chart, and the like, as are generally known. When an image is rendered to a memory or storage, the values of the color pixels are generally stored in any of a variety of known formats such as, for example, BMP, JPEG, GIF, TIFF, or other formats employed for storing image data on a storage media for subsequent retrieval. Received pixels of an input image are associated with a color value defined in terms of a color space, comprising typically 3 color coordinates or axes.

An "imaging device" is any device with at least one of an image input device or an image output device or both. The set of image output devices includes xerographic reproduction systems, multifunction devices, monitors and other displays, image processors (including Graphics Processing Units or GPU), computer workstations and servers, and the like.

An "image input device" is any device capable of capturing image data as an image capture device and/or for reproduction and display of an image as an image output device. The collection of image output devices includes xerographic systems, multifunction devices, monitors and other displays, image processors (including Graphics Processing Units or GPU), computer workstations and servers, and the like. Image output devices receive a signal of an image and reduce that signal to a viewable form.

An "image output device" is any device capable of receiving a signal of an image and rendering that image to a viewable form.

An "imageable substrate" is a substrate such as paper, film, cardstock, photographic paper, Mylar, and other printable surfaces, upon which an image can be marked or printed.

General Overview of Frame-Based Coordinate Systems

An overview of Cartesian coordinate systems is found online at the URL (http://en.wikipedia.org/wiki/Cartesian_coordinate). The axes in the coordinate space go on forever in each direction, and with 4 quadrants, all but the first has negative values ({+,+}, {-,+}, {-,-}, {+,-}). Mapping between different Cartesian coordinate spaces is known and described in many linear algebra books. When it comes to describing the coordinates of an image, sheet or device, a corner is selected as the origin. The coordinates in the frame are typically described in positive values, i.e., within the frame, the default, regardless of the corner chosen, is essentially equivalent to the first quadrant ({+,+}). Note that, of the 8 possible axes orientations there is only one standard coordinate space—the canonical space, by our definition, that is consistent with the common Cartesian coordinate space. All other relative corners and axis directions create non-standard coordinate spaces relative to canonical. In this context, axes have been reflected relative to corner origins offset from canonical. It is important to note that negative values are possible in applications where the frame coordinate spaces go on indefinitely. For example, it is possible for a clipping window to go out of bounds and have some negative coordinates by going off an image, sheet, or device frame.

Exploded View of 4 Different Regions

Figure 2:
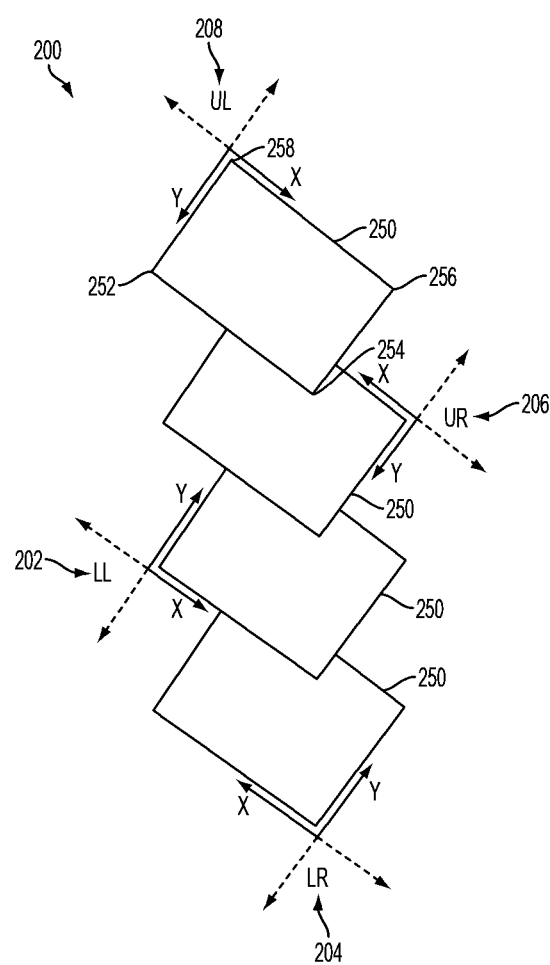
FIG. 2 is an example of an exploded view of four different origins of a given 2D coordinate space for a set of axes X and Y.

Reference is now being made to FIG. 2 which is an example of an exploded view of four different origins in a given 2D coordinate space for a set of axes X and Y. The corners are denoted as lower-left (LL) 202, lower-right (LR) 204, upper right (UR) 206, and upper-left (UL) 208. For the 2D frame case, with 4 axes and 2 permutations per axes where the first quadrant ({+,+}) axes are oriented towards the frame. For simplicity, these orientations are used in a consistent manner with reference to the remaining figures.

Figure 3:
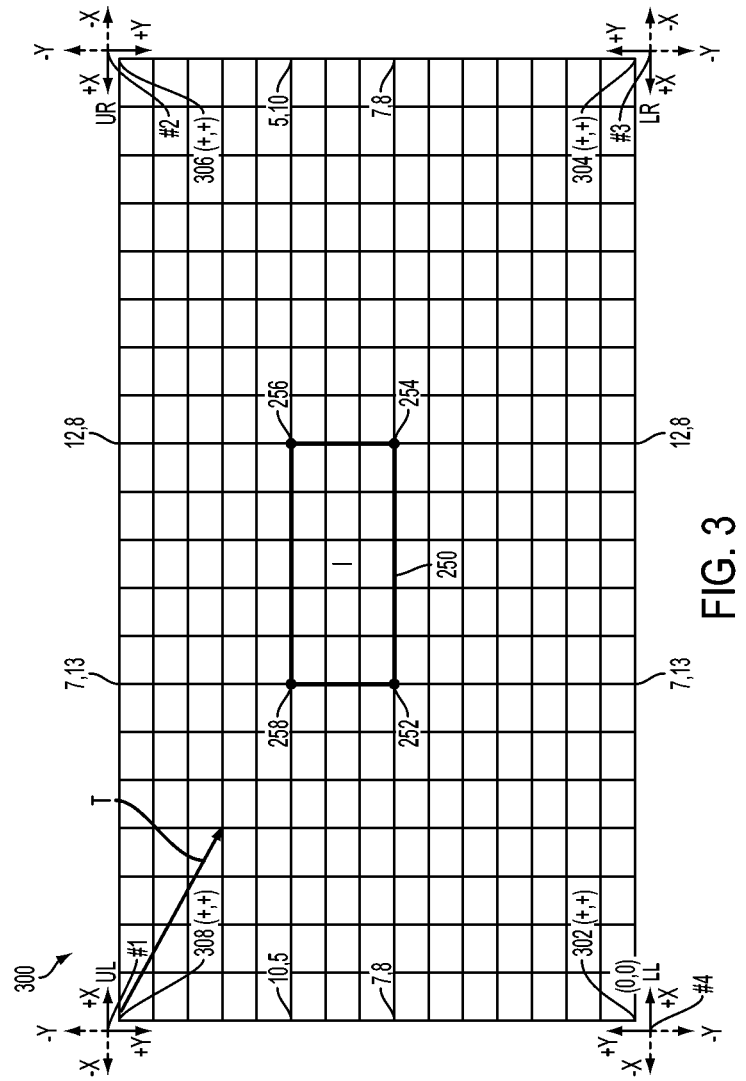
FIGS. 3 and 4 show graphs of an example image frame with a clipping window wherein all eight rectangular coordinates spaces as used.
Figure 4:
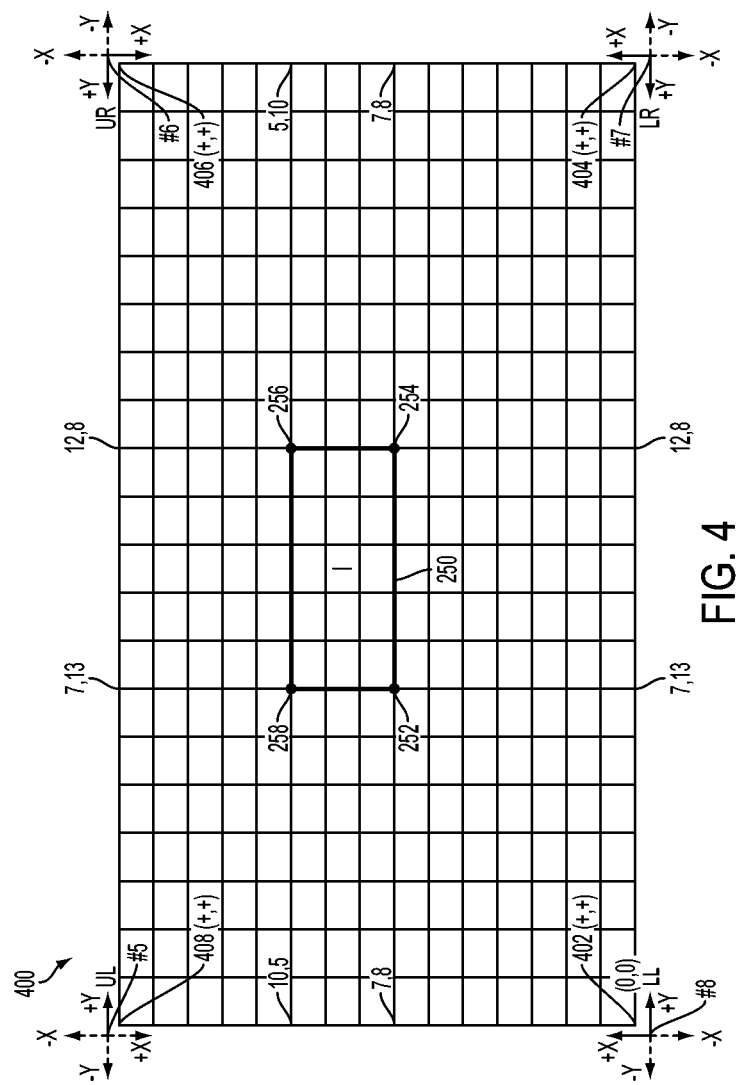

Turning now to FIGS. 3 and 4, shown is a first 2D frame 300 and a second 2D frame 400. FIG. 3 has 4 corners lower-left 302, lower-right 304, upper right 306, and upper-left 308. For the 2D frame case, with 4 axes and 2 permutations per axes where the first quadrant ({+,+}) axes are oriented towards the frame, there are 8 different coordinate spaces for a frame as shown across FIG. 3 and FIG. 4. FIG. 3 has X/Y axes going in a way a user might typically think about X/Y from Cartesian directions (i.e., X-axis horizontal, Y-axis vertical). In one embodiment the coordinate spaces in FIG. 3 on the screen as the defaults and the user is able to select the FIG. 4 spaces as an alternative. Note that other axes permutations are possible for 3-D space and are not shown.

FIG. 5 is a table of Coordinate Change Matrices (CCM) used for mapping from a first coordinate space to a second coordinate space. For convenience, both figure and item numbers are shown in the first two columns. For example, row 1 denotes 2D (two dimensional) frame 300 with corners lower-left 302. Both the 2D and 3D (three dimensional) Coordinate Change Matrix are shown.

Using the table of FIG. 5, after the image data is received in a first coordinate space, a determination is made of which type of transformation has to be made in order to map the data in the first coordinate space to the intermediate image coordinate space. The technique is known as "change of basis" (or, "coordinate change"). In this implementation, the coordinate spaces are orthogonal and objects are typically axis-aligned where mappings are based on a computational framework that formally describes such spaces. The affine coordinate/orientation matrices created by the inventor as shown in FIG. 5 are used to map between overlapping frame-based coordinate spaces. For simplicity, the corners 252, 254, 256, 258 of frame 250 in currently in non-canonical coordinate space is mapped to a source canonical space, in this example corner 302 i.e., {0,0} in the $1^{st}$ quadrant. This is for simplicity only and it is possible to map other corners as well. If the dimensions of the source and target frame are different, the origins must be translated as well based on the dimensions of the frame. For example, an 8.5" (height)×11" (width) landscape frame will have corner coordinates of ({0,0}, {11,0}, {0,8.5}, {8.5,11}). The orientation matrix=CCM=Coordinate Change Matrix must be scaled to user settings. This special scaling operation changes the origins by changing the origin translation offset and therefore resizing the unit square in 2D (or unit cube in the case of 3-D) to the actual size of a given object. It can be envisioned as stretching a unit square (a unit cube where Z=0) to the particular dimensions of a given frame. For further information on expanding a 2D frame to a 3D space, refer to the above-incorporated reference entitled: "Frame-Based Coordinate Space Transformations Of Graphical Image Data In An Image Processing System".

Once the correct Coordinate Change Matrices (CCM) have been selected from FIG. 5 and special scaled to cover the shape of the object, based on the source object dimensions and coordinate spaces, then apply a linear algebra change of basis using these special orthogonal orientation matrices map between the source and target spaces. The linear algebra has been simplified by the creation of these predefined Coordinate Change Matrices in FIG. 5. And the creation of a special scaling function to simplify modification of origin offset in the matrix relative to the canonical origin.

As an example, suppose the source image in a first coordinate space is in corner 406 of FIG. 4, with X-axis downward and the Y-axis leftward. In order to map the coordinate space of the source image to an intermediate image canonical coordinate space (in this example corner 302 with origin {0, 0}, which is logically independent of the imaging device), then FIG. 5 Item 302 is selected and the Coordinate Change Matrix is found in the Coordinate Change Matrix table of FIG. 5. Stated differently, the following entry from the table of FIG. 5 is selected to mathematically map the image data from the source coordinate space to the intermediate image canonical coordinate space. Since these are invertible matrices and only the forward transforms are provided, in this example the inverse of the matrices must be used. Therefore, after a mapping from canonical space is selected, in this example item 406, a 2D Matrix from FIG. 5, the matrix inverse of the appropriate matrix is performed to map back to canonical space.

$$\begin{pmatrix} 0 & -1 & 0 \\ -1 & 0 & 0 \\ 0 & 0 & 1 \end{pmatrix}$$

Continuing with this example, if the target coordinate space is corner 308 of the frame with X-axis running rightward and the Y-axis running downward, then the following entry, item 308 of FIG. 5, is selected to mathematically map the image data from the intermediate canonical coordinate space to the desired target coordinate space.

$$\begin{pmatrix} -1 & 0 & 0 \\ 0 & -1 & 0 \\ 0 & 0 & 1 \end{pmatrix}$$

It should be understood that using the combination of a Coordinate Change Matrix in FIG. 5, along with an intermediate canonical coordinate space with coordinates that are logically independent of the coordinate space of both the source and target imaging device, the coordinates can easily be transformed between them.

High-Level Flow

Figure 6:
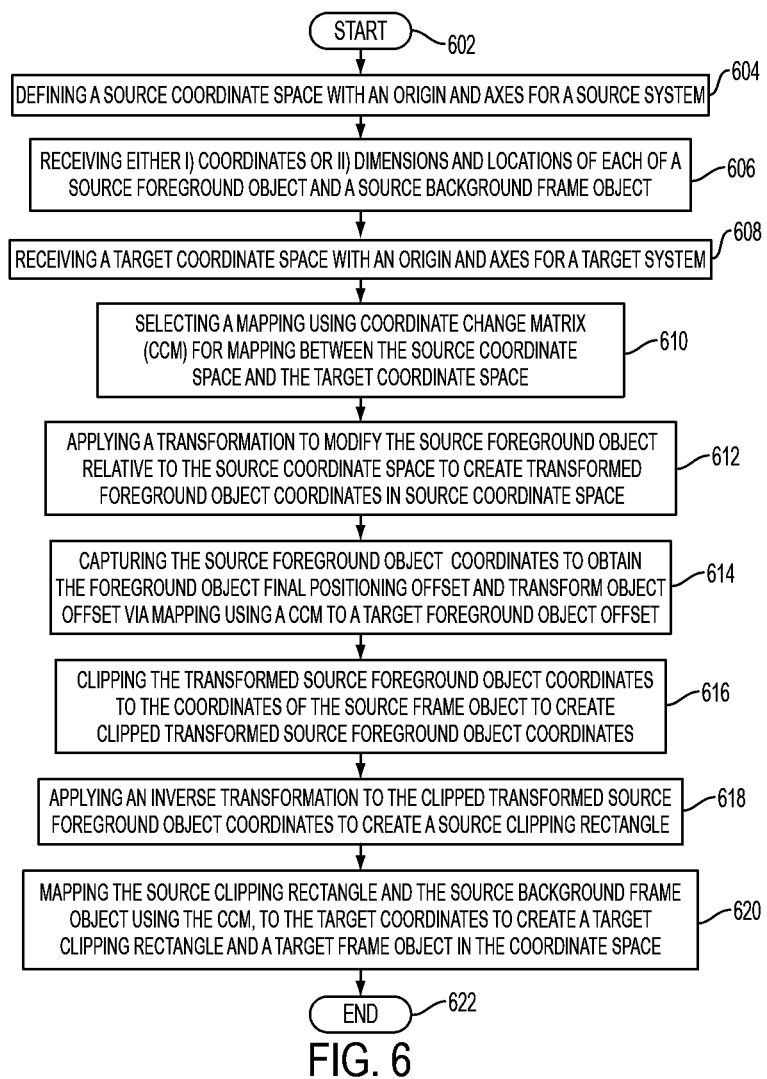
FIG. 6 is a high-level flow diagram of the present method for transforming coordinates in an imaging device.

Turning now to FIG. 6, shown is a high-level flow diagram of the overall method for transforming coordinates in an imaging device, such as the coordinates with origin 104 from Model A 102 MFD to coordinates with origin 154 on Model B 152 MFD. The method begins at step 602 and immediately proceeds to step 604, where a source coordinate space is defined and an axis for a source system, such as from Model A 102 MFD.

In step 606, coordinates or simply dimension and locations of both a foreground source object and a source background frame object is received. Continuing with this scanner platen example, the coordinates of scanner platen is the source background frame object. Likewise, an imageable substrate, such as paper with printed information, is the source foreground object. It is important to note that this invention is not limited to scanner-imageable substrate examples and that other combinations and abstractions are possible to those skilled in the art. In FIG. 9, shown is a table that represents other pairs of source foreground objects and source background frame objects within the true scope and spirit of the invention. For example, referring to row 1 of the Table in FIG. 9, a source foreground object (row) may be paired with any source background frame object (column) as denoted with "X".

For example as shown in the table of FIG. 9, source foreground object is one of: a rectangular region; an electronic image; an imageable substrate; a scanner; a raster output system; a display device; and an imaging processing card. The source background frame object is one of: a rectangular region; an electronic image; an imageable substrate; a scanner; a raster output system; a display device; a paper path; a finisher; or an imaging processing card.

In step 608, a target coordinate space with an origin and an axes is received. Continuing with this example the target coordinate space is Model B 152 MFD.

In step 610, a mapping is selected using a Coordinate Change Matrix (CCM) of FIG. 5 to map between the source coordinate space and the target coordinate space. It is important to note that the matrices as shown at the end are special scaled using Mathematica code. Prior to this special scaling, the matrices represent a real object, as opposed to just a device. Moreover, the default form of the matrices represent the orientation but not the specifics of where the origins lie, i.e., a function of the size/dimensions of the rectangle. Therefore the special scaled matrices will appear like the originals in FIG. 5, but the translation values will be changed to reflect actual object size and origin relative to the canonical space. In a unit cube/square, the origins are offset by a unit value. Here the matrices are scaled by factors exactly related to the size of the object/frame. For example, suppose we want to map between lower left to upper right, the matrix from each row is selected. In this example the matrix from in FIG. 5, item 302 and item 406 are selected. Note that for Item 406 in FIG. 5, X proceeds from top to bottom, and Y proceeds from right to left.

In step 612, a transformation is applied to modify the source foreground object relative to the source coordinate space to create transformed source foreground object coordinates within the source space In step 614, the source foreground object coordinates are captured to obtain the foreground object final positioning offset and transform object offset via the CCM mapping to a target foreground object offset.

In step 616, the transformed source foreground object coordinates are clipped to the coordinates of the source frame object to create clipped transformed source foreground object coordinates. Note that clipping only occurs when an operation causes an object to exceed the frame boundaries. For example, when a transformation such as scaling, translation, reflecting, and rotation causes the object to partially move off the background frame. If the operation causes the coordinates to stay within the frame then the coordinates will not be clipped to frame (will be whatever they become after the operation).

In step 618 an inverse transformation is applied to the clipped transformed source foreground object coordinates to create a source clipping rectangle.

The process continues in step 620 where the source clipping rectangle and the source background frame object are mapped using the CCM, to the target coordinates to create a target clipping rectangle and a target frame object in the target coordinate space. The process exits in step 622.

It is important to note, that the overall mapping is typically from source coordinate space to canonical coordinate space to target coordinate space. A pair of CCMs are being used in this embodiment to facilitate this mapping. However, in another embodiment, a composite matrix maybe used to get the final source coordinate space to target coordinate space mapping. In this embodiment, a single Composite Transformation Matrix (CTM) is used in place of the two-step CCM approach to achieve identical results.

In one embodiment, the process flow in FIG. 6 further includes implementing this on actual image data by clipping actual image data using a target clipping rectangle in a target system. An original transformation is applied to the actual image data in the target system and the clipped image is placed using the transformed foreground object coordinates and the previously saved and transformed positioning offset in the target system.

In another embodiment, the transformation includes a scaling matrix with scaling factors to scale the coordinates of the source foreground object relative to the source coordinate space to create transformed source foreground object coordinates which have been scaled.

In still another embodiment the transformation includes rotation factors used in a rotation matrix to rotate the coordinates of the source foreground object relative to the source coordinate space to create transformed source foreground object coordinates which have been rotated.

In still another embodiment the transformation includes a translation matrix with translation factors to translate the coordinates of the source foreground object relative to the source coordinate space to create transformed source foreground object coordinates which have been translated.

In yet still another embodiment the transformation includes a reflecting matrix with reflecting factors to translate the coordinates of the source foreground object relative to the source coordinate space to create transformed source foreground object coordinates which have been reflected.

For clarity, note that graphics operations of rotation, scaling, translation and reflecting can and are used in two different contexts. The first embodiment is from the current user or device perspective, and such operations occur within the particular UI and/or device inherent spaces (within-space operations). The second embodiment is for emulation where behavior is mapped from one imaging device to another (across-space operations) at either the UI and/or device levels.

Logical Layering

There are two independent levels of mapping. First there is user interface (UI) mapping to the device. And second there is an intra-device/inter-device mapping. This second level has been referred to above i.e. mapping from a first device to a second device.

Just as the intra-device/inter-device mapping can be abstracted, the user mapping can be abstracted. This is performed by having a common or user definable UI for each device. Either type of UI can be implemented using the present invention. For example the user with a touch screen can select a desired origin for image data or an object or a sheet, regardless of the image processing device.

Although two devices are discussed, it should be appreciated that there could any number of devices with perhaps different underlying order-of-operations all with a common user interface experience. The user interface experience may be independent of the device. There is a mapping from the user domain to the device domain.

Figure 7:
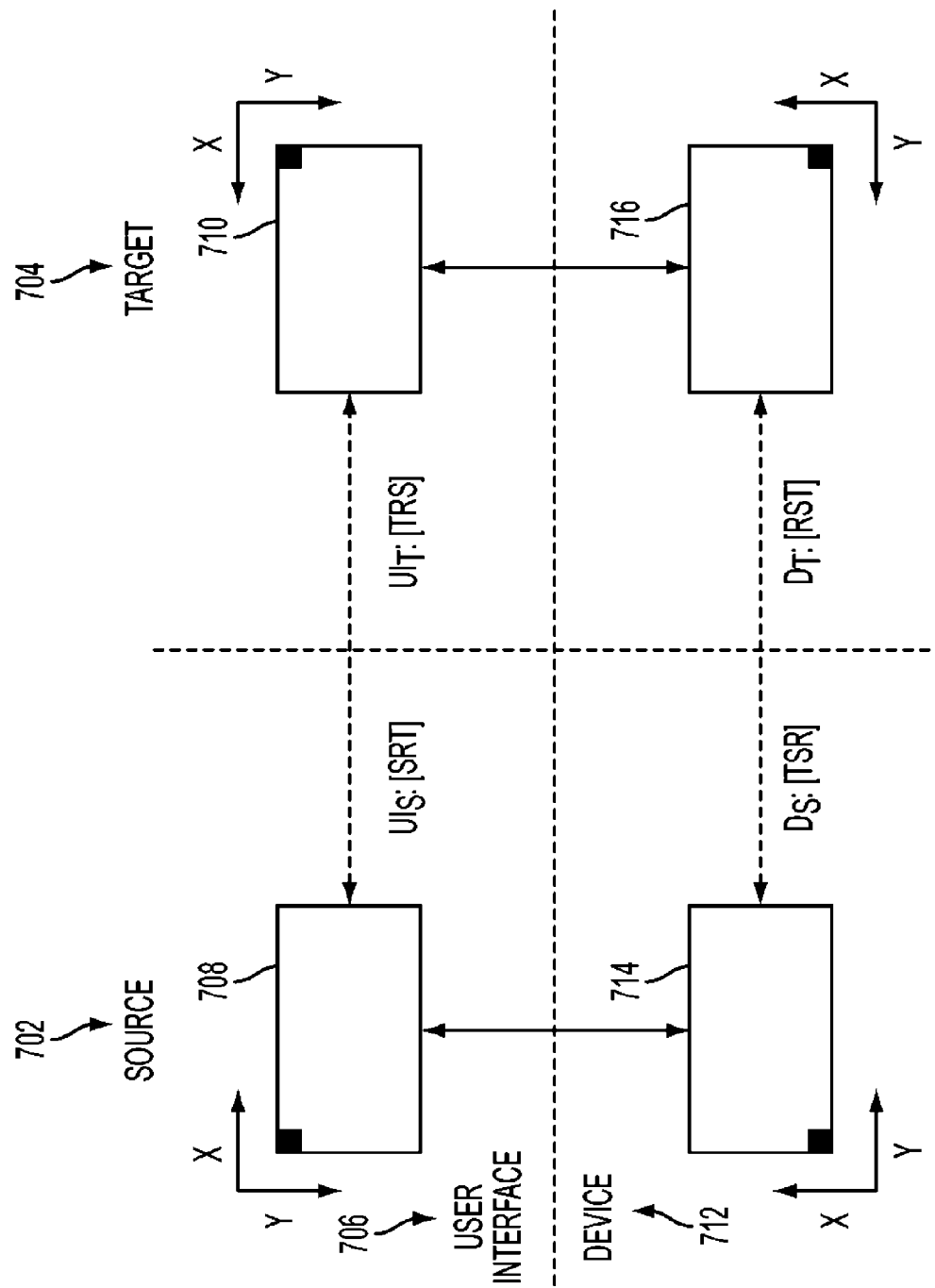
FIG. 7 shows an example of logical layering.

Turning to FIG. 7, shown is this layered architecture. There are two layers showed UI Level Transformation 706 and Device Level Transformation 712. The two layers are portioned into a source partition 702 and a target partition 704. The upper two partitions represent UI Level Transformation ("UI") 706 for the source user interface 708 and target interface 710. The two lower partitions 714 and 716 represent the Device Level Transformation ("D") 712 for the source device 714 and the target device 716. Representing this logical layering in matrix transform notation, this logical layering diagram illustrates a source device $D_S$ 714 to a target device $D_T$ 716. Combining the two mapping is described as a source user interface denoted "$UI_S$" 702 on a source $D_S$ 708 and a target user interface "$UI_T$" 704 on a target $D_T$ 710. There is a dashed line between $UI_S$ 708 and $UI_T$ 710 to logically denote one user experience across two devices. An overall a mapping is $UI_S D_S D_T UI_T$.

Referring to FIG. 7, in this example a source device behavior of scaling, translation, reflecting, and rotation of $D_S$ 712 is to be implement on the target device $D_T$ 714. There is one user experience $UI_S$ 708 on $D_S$ 714 and another user experience on $UI_T$ 712 on $D_T$ 716. Stated differently, the source and target device have different behaviors such as going off frame, clipping, scaling, translation, reflecting, and rotation and more. The user using $UI_S$ 708 can make the target device $D_T$ 714 behave as if was being operated by user interface $UI_T$ 710.

Further, different orders of operations (OOO) are also shown in each quadrant $UI_S$ [SRT]; $UI_T$ [TRS]; $D_S$ [TRS] and $D_T$ [RST] and these order of operations are implemented as described further below.

System Diagram of Imaging System

Figure 8:
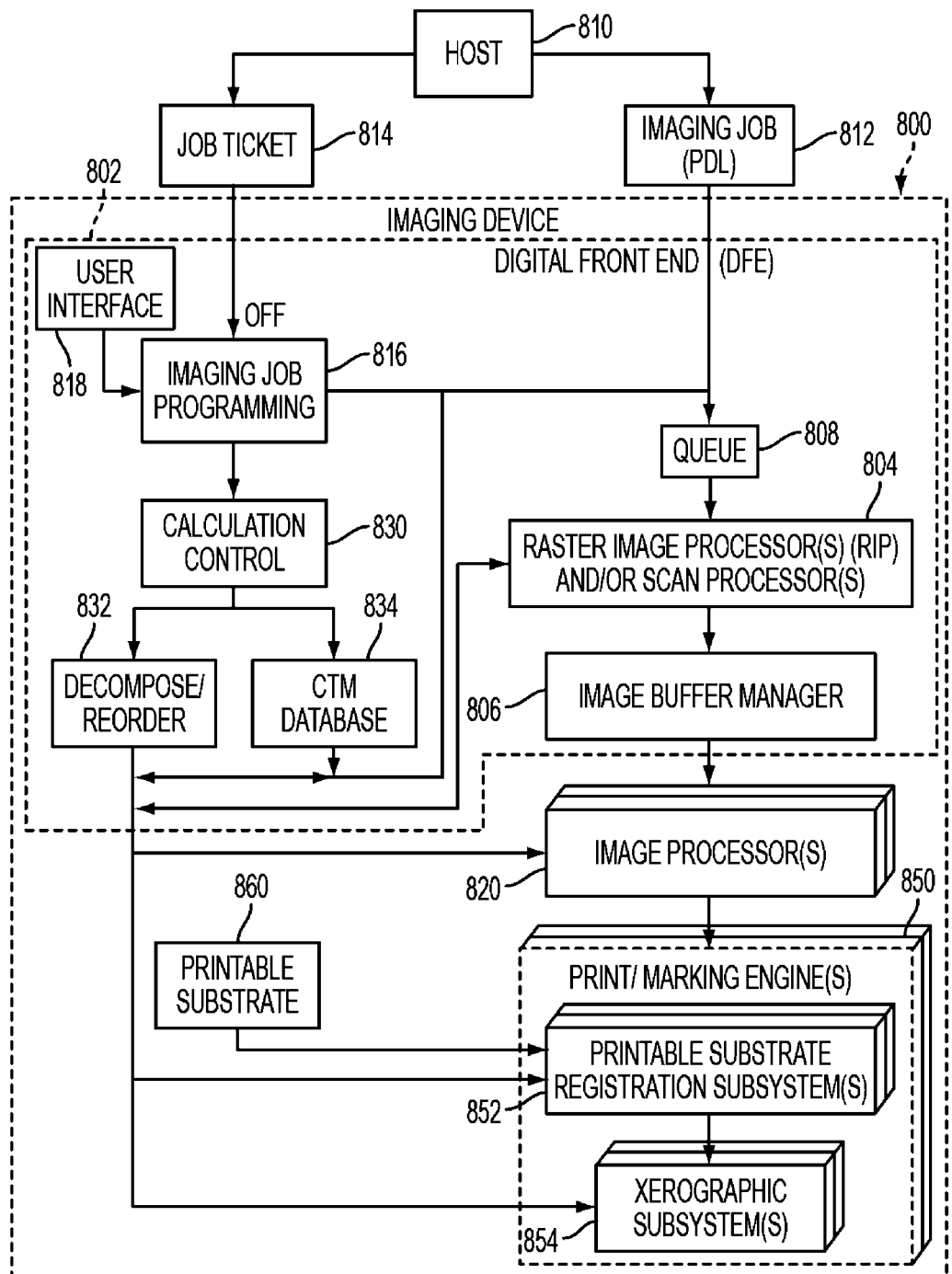
FIG. 8 is a system diagram used to carry out various embodiments hereof.

FIG. 8 is a system diagram of the imaging device used to carry out the method of FIG. 6, according to an embodiment hereof, illustrating an example image path for printing, scanning, copying or a combination of each of these operations in an imaging device 800. Imaging operations are performed across possibly different sub-systems within an imaging device, such as a printer, multifunction device, scanner, fax, copier or other system and devices. The manipulations include the image transformations of user and/or device scaling, translation, reflecting, and rotation.

There are two types of set-up for a system: job-level setup and device level setup also known as system-level setup. Policies and/or imaging device system configurations are used to emulate the same job-ticket across a variety of imaging systems. Job-level is on a per job basis. Using job-level setup, such as through UI Level Transformations and policies could be set to emulate a certain manufacturer's machine always. This would make a job portable across different manufacturer's imaging devices. On the other hand device level setup changes the device for all jobs.

The imaging device 800 in accordance with one or more aspects of the present disclosure, comprises one or more Raster Image Processor(s) (RIPs) and/or scan processor(s) 804 associated with an image buffer manager 806 communicatively coupled to a print engine(s) 850 that print images on a printable media or printable substrate 860 introduced thereto. For scanning or copying or faxing operations, the job may not be printed but rather put in an imaging buffer manager 806 for later use such as e-mail, local or remote storage, and more non-printing functions. The term "scanning" is used in this description to mean scanning, copying or faxing.

The imaging device includes a digital front end 802 (DFE) having calculation control 830 and a transformation data in a Composite Transformation Matrix (CTM) database 834 with a matrix decompose/reorder module 832 for applying transformation on images over one or more sub-systems of RIPs and/or scan processor(s) 804, one or more image processor(s) 820 and print engine(s) 850 according to the present invention. Although the image processor(s) 820 are shown outside the DFE 802, it in this embodiment, in other embodiments the image processor(s) 820 are inside the DFE 802. The CTM database 834 includes data to handle UI Level Transformation and/or Device Level Transformation of as scaling, translation, reflection, and rotation. The DFE 802 may include additional RIP instances (not shown), such as a PostScript RIP, a PCL RIP, etc., wherein each RIP instance is operatively coupled with corresponding multiple imagers. Furthermore, a single print job may be processed by two or more RIP instances of the same type (e.g., page parallel RIP). The print engine(s) 850 may include separate color and monochrome engines that work cooperatively under the control of more than one image processor(s) 820. For example, many times different image processors are used to perform separate tasks, e.g., translation/rotate and another to perform compression, although not a requirement of the disclosure. In another possible implementation, for example, two or more color imagers could be provided with a single component RIP and/or scan processor(s) 804 in a DFE 802, where one of the imagers is associated with a print engine having a lower print cost than a print engine associated with the other imager. Still another possible example includes two or more monochrome imagers associated with print engines having different associated print costs. The imaging device 800, moreover, can have a modular architecture that allows print engine(s) 850 to be interchanged with other print engines, wherein some engines may be adapted to produce color printed images while others may be limited to monochrome imaging. The DFE 802 includes an image buffer manager 806 for managing output from the RIPs and/or scan processor(s) 804 being fed into the print engine(s) 850. Although the image processor(s) 820 is shown as part of the imaging device 800, it is important to note that the image processor(s) 820 may be in multiple places within the image path and/or divided into more than one image processor. Image processor(s) may be utilized, for example, to aid in the rendering part of RIP (in-RIP), post-RIP when reprinting, and in the print engine(s) 850.

The CTM database 834, in one embodiment, stores imaging operation information to different imageable substrates e.g. different sheet sizes, different sheet weight, and other system/printer/scanner/copier/multifunction device variables including sheet feeding trays and finishing devices. Also, the imaging operation information can include pathways thru the system, for example different sized papers, or trays, going thru the system as simplex or duplex and being sent to various output trays, finishers, and staplers. Stated differently, the use of the CTM database 834 provides associated information and metadata describing the information in a database record for a CTM. Suppose a run-time scenario an imaging job comes in for a request for given imageable substrate, the image system 800 is configured based on these requirements and the corresponding CTM is retrieved from the CTM database 834 and configures the incoming job to run it in PostScript. The CTM can be applied at different sub-systems in the imaging system 800 as further described below. The print engine(s) 850 may be any device or marking apparatus for applying an image from the DFE 802 to printable substrate (print media) 860 such as a physical sheet of paper, plastic, or other suitable physical media substrate for images, whether precut or web fed. The print engine(s) 850 generally includes hardware elements employed in the creation of desired images by xerographic processes and may also include ink-jet printers, such as solid ink printers, thermal head printers that are used in conjunction with heat sensitive paper, and other devices capable of printing an image on a printable media 860.

The DFE 802 can be any suitable hardware, software, or combinations thereof, whether a unitary system or a plurality of systems implementing the front end functionality in distributed form to provide an interface between submitting host 810 providing job ticket(s) 814 through imaging job programming 816 connected to a User Interface ("UI") 818 as part of the DFE 802. In another embodiment the host 810 provides incoming imaging job(s) 812 to the print engine(s) 850 in the print path or scan processors 804 in the scan path. In one embodiment, the print path for the imaging device 800 can be any form of commercial printing apparatus, copier, printer, scanner, fax machine, or any other printing system with one or more print engine(s) 850 by which visual images, graphics, text, etc. are printed on a page or other printable medium 860, including xerographic, electro photographic, and other types of printing technology, wherein such components are not specifically illustrated to avoid obscuring the various alternate imaging features of the present disclosure.

FIG. 8 includes a queue 808 having various hardware memory, disk drives, or other storage apparatus by which one or more incoming print/scan/copy/fax, i.e., MFD jobs 812 can be received from a computer or other host 810 and stored, in whole or in part, for processing by a RIPs and/or scan processor(s) 804. The scan or copy can be local or remote to imaging device 800. The scan/copy typically produces a PDF file or an image file, such as TIFF. The print path can consume PDFs that get RIPped into images, including TIFF. For example, the image job 812 may be generically PDL or specifically PDF in the case of printing. Likewise, in the case of scanning or copying, the imaging job 812 may be PDF or TIFF. In one embodiment, the RIPs and/or scan processor(s) 804 operates in concert with the queue 808 to process incoming print jobs 812 to thereby create RIPped or scanned objects, which are stored in an image buffer manager 806 of the DFE 802. Calculation control 830 in association with Composite Transformation Matrix (CTM) database 834 and CTM decompose/reorder module 832 provides image operations of user and/or device translation, rotation, reflection and scaling using one or more CTMs at various sub-systems within imaging device 800. Some sub-systems such as the RIPs and/or image processor(s) 804 can consume CTMs directly and do not need to consume discrete values after decompose/reorder. However, the print engine(s) 850 as part of the print path of imaging device 800 typically cannot consume CTMs directly and must have these CTMs broken down through matrix decompose/reorder module 832 into discrete values. See the above-incorporated reference entitled: "Method And System For Utilizing Transformation Matrices To Process Rasterized Image Data".

In one embodiment, imaging jobs commonly RIPped/scanned into the image buffer manager 806 are processed by image processor(s) 820 to produce raster page images for use by print engine(s) 850. In the print engine, a printable substrate registration sub-system 852 aligns the printable substrate 860 for image formation on xerographic sub-system(s) 854. In one embodiment, imaging operations (scaling, translation, reflecting, and rotation) may be executed using CTM database 834 entries that have been decomposed and reordered 832 and applied to either the paper registration sub-system(s) 852 or the xerographic sub-system(s) 854 or both.

Imaging device 800 can receive job programming 816 at the user application level. For example, a job may include rotating an image by 90, 180, or 270 degrees, scaling up or down the image, or translating/shifting the image in one or more directions. Job programming 816 is handled by RIPs and/or scan processor(s) 804 or at image processor(s) 820. For example, during or after RIP or scan a translation and/or rotation is performed according to the user application in order to accommodate a printable substrate 860 with 3-holes punched along one side.

Using the present invention the imaging device 800 can be setup to emulate a certain manufacturers' hardware for every job. This emulation allows all jobs originally created for one manufacturer's hardware to be run on a different manufacturer's hardware while producing the same results. This makes a job portable across different manufacturer's imaging devices. For example, if an operator or company is familiar with jobs created for a specific hardware model, the present invention allows this job to run these model-specific jobs and through emulation by automatically reordering the job to run.

Using emulation, policies can be implemented for the imaging system 800 for emulation to allow all operators to have all the same experience. In one embodiment, various emulation profiles can be setup and submitted with job tickets 814 to permit emulation. In another embodiment attributes to the media itself, such as the printable substrate, 860 can be used for emulation. As an example, if the media is high quality photographic paper, the emulation maybe tied to a certain photographic model printer. Continuing further, if the media is plain paper, the emulation may be another manufacturer's multifunction device (MFD) device or multifunction copier (MFC). These techniques apply equally well to virtual printers where users may submit an imaging job to a virtual printer queue that contains information about desired emulation (e.g., setting up a virtual printer to behave like another printer). This makes the experience for the user consistent across machines.

Both device and application or user requirements including order of imaging operations can be emulated using the present invention. For example, two sets of imaging devices can have different order of operation, which is "noncommutative" generally. In other words, performing a set of operations in a different order typically yields different results. That may be an entirely different scenario from a User Interface that "bakes in" some order. Further, many times both source imaging device and target imaging devices "bake in" order, and the present invention enables mapping between those logical orders. The use of reordering as described below can be composited, both at both the device and the application levels to permit emulation at either or both of these logical levels.

It is important to note that the matrix decomposition described in the present invention can work in conjunction decomposition described in other patent applications where CTM are used to both perform emulation and also to correct registration problems. See the above-incorporated reference entitled: "Method And System For Utilizing Transformation Matrices To Process Rasterized Image Data".

In another embodiment, job programming 816 and CTMs from CTM database 832 under calculation control 830 are combined at RIPs and/or scan processor(s) 804 and/or combined at the image processor(s) 820 or a portion of the transformation applied at both the RIPs and/or scan processor(s) 804 and image processor 820. The process of decomposition/reordering image transformations 832 using CTM has been referenced above. Using the architecture of the present invention, it is possible to combine several different sources of emulation to the imaging device 800. This combination of emulation can be made in both the print path and the scan path. For example in the print path, emulation can be made by both the user applications specified by job programs 816 and the site policies 814. This combination of emulation can be further combined with compensation made to adjust the print engine(s) 850. Likewise, in the scan path, adjustments can be made by both the user applications specified by job programs 816 and the site policies 814 to be combined seamlessly with emulation of hardware and compensations made to adjust the scanned image to remove scanner inherent distortions/misalignments. See the above-incorporated references entitled: "Controlling Placement And Minimizing Distortion Of Images In An Imaging Device" and "Architecture For Controlling Placement And Minimizing Distortion Of Images".

Adjustments can be further combined to adjust the scan engine(s) (not shown). The present system and method permits adjustments to be made in various places. In one embodiment, the compensation/adjustments are made, wherever they occur, in order to correct for inherent systemic differences between devices. Further these adjustments/compensation can be a pure correction, applied e.g., at RIP-time, dynamically for each image generated. In another embodiment these adjustments/compensations could be more static as controlled by the "machine setup" for printable substrate registration sub-system(s) 852 and xerographic sub-system(s) 854. For example, the job programming specifies a 90 degree rotation and calculation control 830 compensates for a 0.5 degree rotational error in the print engine(s) 850. These are two transformations of 90 degrees and 0.5 degrees. Transformations can be combined or composited then decomposed and the decomposed operations can be distributed across 4 regions of device 800 as desirable. These four distinct regions are: i) the RIP(s) and/or ii) scan processor(s) 804, iii) the image processor(s) 820; and/or iv) the print engine(s) 850.

Further, the print engine(s) 850 broadly has at least two distinct sub-systems where these transformations can be applied individually or together i.e., the paper (imageable substrate) registration sub-system(s) 854 and xerographic sub-system(s) 852 in the print engine(s) 850. Applying the transformation at RIPs and/or scan processor(s) 804 allows print changes to be addressed for a specific imaging device 800. These print changes many times are independent of image quality problems, which is desirable. On the other hand, applying the transformation at RIPs and/or scan processor(s) 804 or scan time results in the machine-specific corrections/transformations to become part of the image i.e., "baked into the image" independent of image quality problems. Therefore, transformations applied during RIP are no longer independent of the print engine; rather these transformations are dependent on the operation to the specific engine. Further, applying the transformation at image processor(s) 820 allows print operations to be applied across various imaging device i.e., the imaging jobs are no longer device dependent to the original device. For example, an emulation sequence or correction operation that is not "baked into the image" could be reprinted from storage to another imaging device that would apply its own device dependent emulation sequence or correction operation to remove the changes on that remote device to improve consistency across the devices.

Still, further, applying at the print engine(s) 850 allows the emulation and alignment issues such as those due to paper quality, types of print media for the printable substrate 860, color overlays, one and two-side printing emulation and alignment, see-through through emulation and alignment, align to emulation and form, emulation and aligning images/paper to be handled very precisely. Printer engine 850 emulation and adjustments allow for corrections to be made possible in a multi-engine environment, e.g., HLC—highlight color and more. In one multi-engine context, for example, proper orientation and alignment is accomplished via emulation, and in another context image alignment is adjusted to remove image registration errors, and the two operations can be seamlessly combined on the appropriate hardware to achieve the desired behavior and corrections.

It should be understood that the architecture described in FIG. 8, with calculation control 830 and CTM database 834 along with decompose/reorder module 832 allows emulation through site policies 814, job programming 816 along with image quality corrections to be combined and applied together or independently over one or more sub-systems of RIP(s) and/or scan processor(s) 804, image processor (s) 820 and print engine(s) 850 according to the system and method hereof.

In another embodiment in which the imaging device 800 has limited computational capacity, such as a multifunction device (copy, scan, fax, printer), the imaging operations of imaging device 800 is performed on a separate computer that is external to imaging device 800. In this embodiment, the operating characteristics including operation-of-order of scaling, translation, reflecting, and rotation of the imaging device 800 is captured as part of emulation policy setup by a customer or a technician. This operation order is gathered by the computer for analysis and computation of the CTMs. The resulting CTMs are then transferred from the personal computer to the imaging device 800.

Mathematica Examples

The present method and system has been modeled using Mathematica by Wolfram Research, Inc. of Champaign, Ill. With respect to FIG. 3 the following abbreviations are being used for the four corners of frame 300 Lower Left (LL) 302, Lower Right (LR) 304, Upper Left (UL) 308, Upper Right (UR) 306. Again, for each origin and axes direction there is a corresponding Coordinate Change Matrix in FIG. 5. In this example, the canonical coordinate space has been selected to be the LL 302 with axes orientations as described by Item 302

FIG. 5. Note that this axes orientation is the standard Cartesian coordinate space. The canonical coordinate space typically serves as the intermediate coordinate space between two coordinate space mappings (including the embodiment where one of the spaces is the same as canonical). Using this intermediate image canonical coordinate space, image data is mapped from one "source" space to a canonical space, then from canonical to another "target" space. In an embodiment, the full composite transform is performed using matrix algebra, in the final mapping between spaces. The present method and system extends that use of composite transform from graphics image space (e.g. Microsoft Office and OpenGL, where each axis continues to infinity) to frame-based X-Y coordinate systems used by imaging devices (e.g., scanners, MFDs, copiers with predefined bounds or limits on each axis) with the various overlapping coordinate systems shown in FIGS. 3 and 4.

Scaling—Mathematica Embodiment

FIGS. 10-17 are a series of actual plots generated by a mathematical model of the flow of FIG. 6 on the system of FIG. 8 for a scaling embodiment. Scaling direction is relative to the particular origin used, such as away or towards an origin. Different imaging devices or software may have different origins and/or axes orientations. The present invention provides a solution to image clipping and scaling when different origins and axes orientations are used. The present invention provides users a consistent workflow solution across different imaging systems. The present invention mathematically emulates behavior across source and target coordinate spaces, models the clipping/cropping effect, compensates for the differences in source and target coordinate spaces, and finally performs image clipping and translation/placement such that the behavior in the target coordinate system emulates behavior of imaging operations in the source coordinate system.

Step 1: Based on Frame Dimensions and Selected Coordinate Spaces Create Coordinate Change Matrices for Source/Target Spaces, and for the Mapping Between Spaces.

In this example, coordinates are in source coordinate space (basis). The source coordinate space must be converted to target coordinate space prior to actual image clipping. Note that in the following code examples the dot (".") operator denotes matrix multiplication, which proceeds from right to left.

sourceCCM=scaleCCM3D[CCM3D01XxYyZz, {20,15,0}];
    targetCCM=scaleCCM3D[CCM3D02XxYyZz, {20,15,0}];
    CCM=targetCCM·Inverse[sourceCCM];

Although these algorithms are in 2D, the CCM3D matrices are used and the Z dimension is set to zero to represent a 2D plane in the 3D space. CCM uses the standard mapping technique from source coordinate space→canonical coordinate space→target coordinate space.

In this example there is a source background object is the rectangle and a source background frame object the frame.

Step 2: Define Rectangle and Frame Affine 3D Coordinates (* This is a rectangle, bounding box, or region of interest *)
    sourceRectangleCoordinates={{0,0,0,1}, {10,0,0,1}, {0,5,0,1}, {10,5,0,1}};
    (* this is the frame of the grid *)
    sourceFrameCoordinates={{0,0,0,1}, {20,0,0,1},{0,15,0,1}, {20,15,0,1}};

Note: Affine point coordinates representing the corners of the rectangle/frame in {x,y,z,1} form, where z=0 for 2D. Also, the frame size is {20,15}. The sourceCCM and targetCCM matrices could have been created by getting the dimensions from sourceFrameCoordinates.

Figure 10:
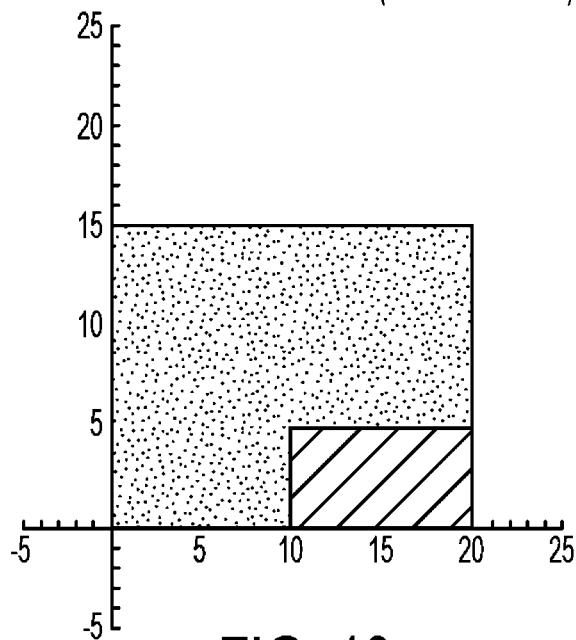

The function showFrames was created to illustrate the present invention. Note that coordinates are displaying relative to the corresponding coordinate space (in this case they are both sourceCCM).

showFrames[sourceRectangleCoordinates, sourceCCM, sourceFrameCoordinates, sourceCCM, "Start. Original lower left (source space)"];

See FIG. 10 which illustrates the starting rectangle and frame coordinates.

Step 3: Create Scaling Matrix. Scale Rectangle Relative to Coordinate Space.

Figure 11:
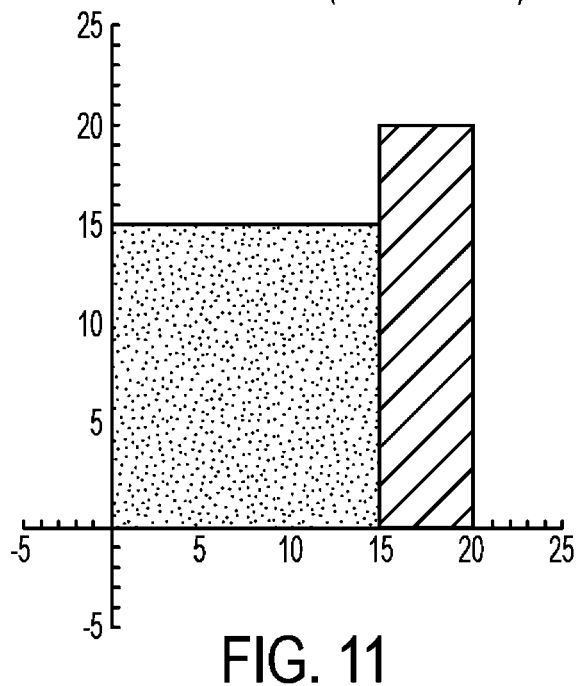
FIGS. 11-18 are plots generated by a mathematical model of the flow of FIG. 6 on the system of FIG. 7 for a scaling embodiment.

Recall that the scaling matrix scales {x,y,z} values within a coordinate space without regard to basis, relative origin, axes orientation etc. Points however are relative to a given basis so as long as they are properly defined non-standard bases and the scaling matrix work together.

scalingMatrix=scale3D[½, 4, 1];
    sourceScaledRectangleCoordinates=Transpose [scalingMatrix·Transpose[sourceRectangleCoordinates]];
    showFrames[sourceScaledRectangleCoordinates, sourceCCM, sourceFrameCoordinates, sourceCCM, "Scale rectangle (source space)"];

Referring now to FIG. 11, note that with scaling the rectangle above goes off the frame. That portion would be clipped to the frame. Recall that this phase is modeling behavior. No actual clipping or printing. This approach overall (all operations) will minimize the need for extra processing, and possibly cleaner device operation. In turn a cleaner device reduces problems and maintenance and sometimes prevents premature failure.

Step 4: Clip Scaled Rectangle to Frame

Figure 12:
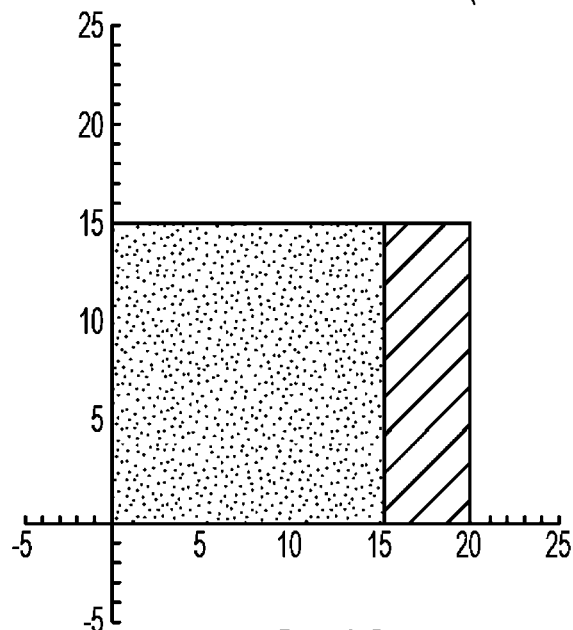
Figure 13:
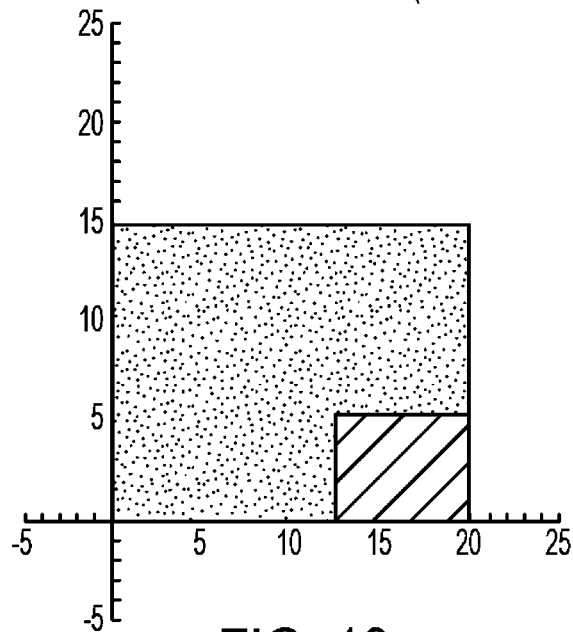
Figure 14:
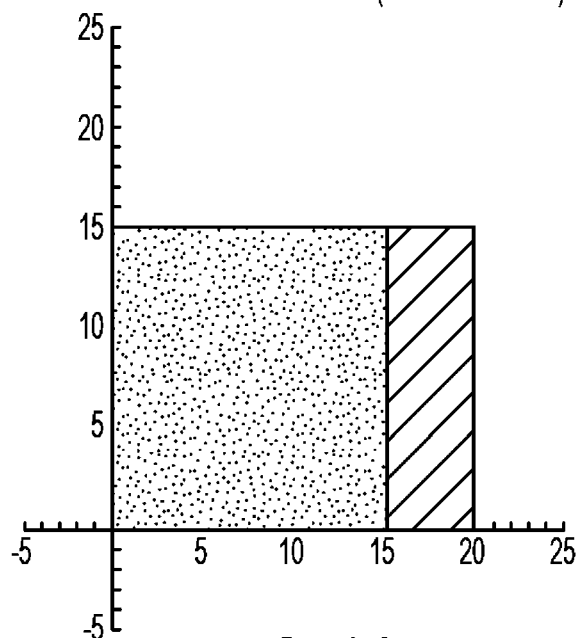

This is to show that we are not actually performing any image clipping. Rather, this is clipping "coordinates".

sourceClippedScaledRectangleCoordinates=clip RectangleCoordinatesToFrame[sourceScaledRectangleCoordinates, sourceFrameCoordinates];
    showFrames[sourceClippedScaledRectangleCoordinates, sourceCCM, sourceFrameCoordinates, sourceCCM, "Clipped rectangle coordinates to frame (source space)"];

Referring to FIG. 12, the scaled then clipped image below is what the user will see. Ultimately, this is the information and appearance desired to emulate in the target device/coordinate system.

Step 5: Inverse Scale Clipped Coordinates

This results in a new rectangle that shows the part of the unscaled image that would "survive" the scaling/clipping. The matrix inverse of the original scaling matrix to scale down is used. Note that the X dimension has not changed because there was no clip to frame in that direction and because it didn't scale past the frame. However, in the Y direction the "de-scaled" matrix is slightly less than the original. Scaling up as a test, this clipped rectangle produces identical results with the clip-to-frame operation.

Next the an inverse scale of the clipped coordinates to yields the exact rectangle to clip. Note the scaling will be from the source coordinate space in FIG. 13.

sourceClippedUnscaledRectangleCoordinates=Transpose [Inverse[scalingMatrix]·Transpose[sourceClippedScaledRectangleCoordinates]];
    showFrames [sourceClippedUnscaledRectangleCoordinates, sourceCCM, sourceFrameCoordinates, sourceCCM, "Unscaled clipped coordinates (source space)"];

Step 6: Map Rectangle and Frame Coordinates to Target Space.

Figure 15:
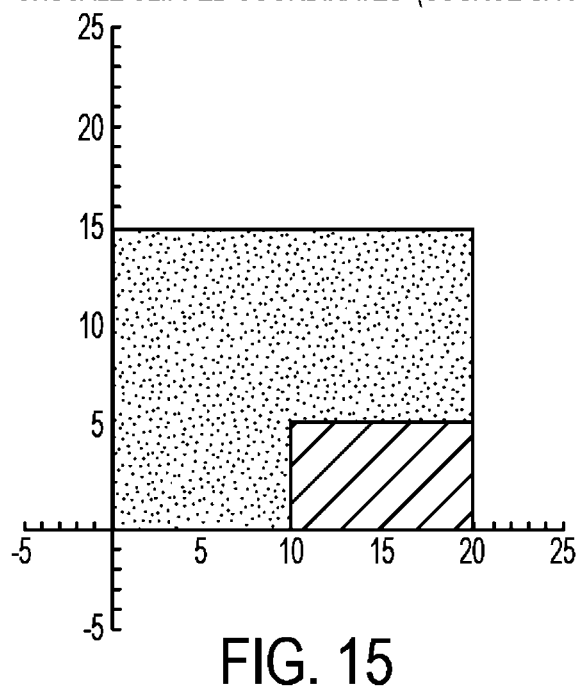
Figure 16:
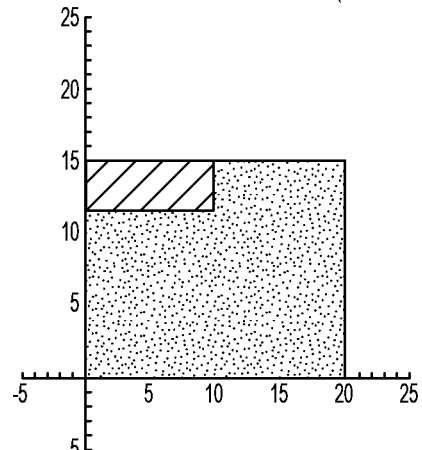

Show both cases mapped to target space. The first mapping here is mapping the frame coordinates from source to target coordinate spaces via CCM. The second mapping below is the inverse scaled rectangle also from source to target spaces targetFrameCoordinates=Transpose[CCM·Transpose [sourceFrameCoordinates]];
    targetClippedScaledRectangleCoordinates=Transpose [CCM·Transpose[sourceClippedScaledRectangleCoordinates]];
    showFrames[targetClippedScaledRectangleCoordinates, targetCCM, targetFrameCoordinates, targetCCM, "Clipped/scaled rectangle (target space)"];

Refer to FIG. 15, this is the rectangle with the information that will be seen by the customer after scaling. That is, it is visually identical to FIG. 10. however all coordinates are now in target space.

targetClippedUnscaledRectangleCoordinates=Transpose [CCM·Transpose[sourceClippedUnscaledRectangleCoordinates]];
    showFrames[targetClippedUnscaledRectangleCoordinates, targetCCM, targetFrameCoordinates, targetCCM, "Unscaled clipped rectangle (target space)"];

FIG. 16 illustrates performing actual clipping to rectangle in target space. Devices clip in their own spaces. This includes clipping via an image processor, or for example clipping due to an image going off-sheet in a particular way. Clipping must be done in target space the way the target device does clipping, not in the way the source device clips in source space. This is the reason for determining clipping window coordinates ahead of time, before actual clipping occurs. There will be overlap of these clipping/shifting operations with the other operations (rotation/translation). When actual image clipping occurs, the resultant clipped image is "anchored" to a particular origin in the target/device coordinate space where clipping occurs. This is a significant issue because the clipped image location will generally be different between source and target coordinate spaces (the exception is two spaces that share the same origin but the axes are transposed. In that case, the location of the clipped rectangle on the frame will be the same).

Here the emulation is performed to illustrate how the image will look if actual image clipping occurred. In one embodiment, an anchor is forced as it will when clipped. It should just be the inverse of the translation. This completes scaling.

translationVector=getClosestCoordinate[targetClippedUnscaledRectangleCoordinates];
    Print["Translation vector:", translationVector];
    targetAnchoredRectangleCoordinates=Transpose[Inverse [translate3D[translationVector[[1,1]], translationVector [[1,2]], 0]]·Transpose[targetClippedUnscaledRectangleCoordinates]];
    showFrames[targetAnchoredRectangleCoordinates, targetCCM, targetFrameCoordinates, targetCCM, "Simulated clipped/anchored rectangle (target space)"];

Step 7: Scale Actual Image in Target Space with Target Device

FIG. 16 illustrates a simulation of clipping in a real target device space. One important consideration is scaling the actual image after clipping. For example, an image in an image buffer, scaling the image isn't placement of the image. And a scaled buffer image is the same, in either source or target spaces, as long as it is scaled correctly in X/Y directions (relative to space). In one embodiment, it is necessary to either convert the scaling factors to the target space, or convert the entire matrix (preferred) by doing a CCM of the function (vs. points/values). There may be a minor error when the source and target frames are different sizes. For example, additional clipping may be required, or different correction shifts after clipping. To fix this error in this illustration, we need to position the image correctly to the scaled image, not the unscaled clipped image. In the atypical case where the source and target frames differ in size additional but straightforward extensions will be required.

Figure 17:
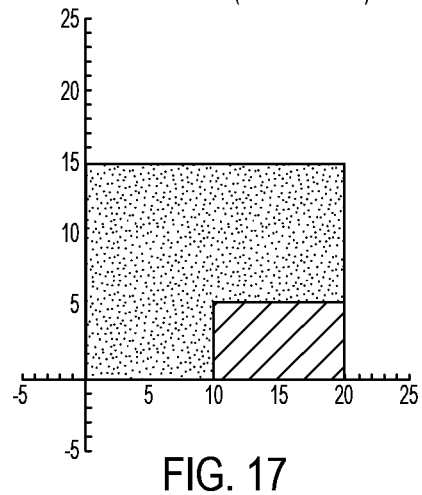

Step 8: Translate (Shift) Actual Image to Correct Final Position targetFinalRectangleCoordinates=Transpose[translate3D [translationVector[[1,1]], translationVector[[1,2]], 0]·Transpose[targetAnchoredRectangleCoordinates]];
    showFrames[targetFinalRectangleCoordinates, targetCCM, targetFrameCoordinates, targetCCM, "Final translation (target space)"];

See FIG. 17. The above rectangle is used to perform ACTUAL image clipping by target Image Processor. Clipped image will be anchored to target origin/corner and now needs to be translated appropriately to visually appear anchored to source origin. Here the translation vector is calculated, which turns out to be the closest point from the target origin of the converted rectangle.

Translation—Mathematica Embodiment

Figure 18:
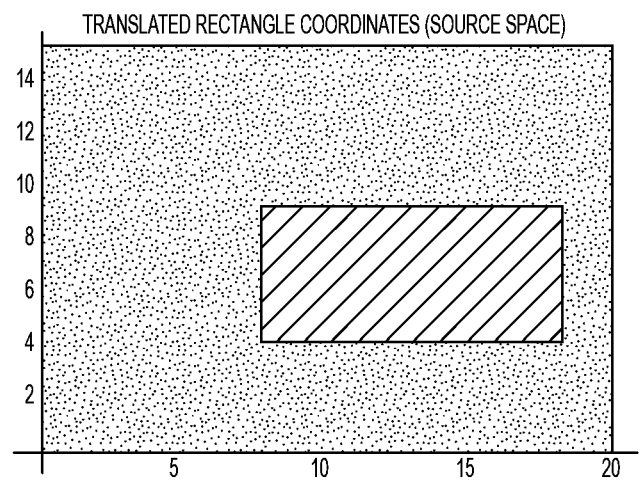
Figure 19:
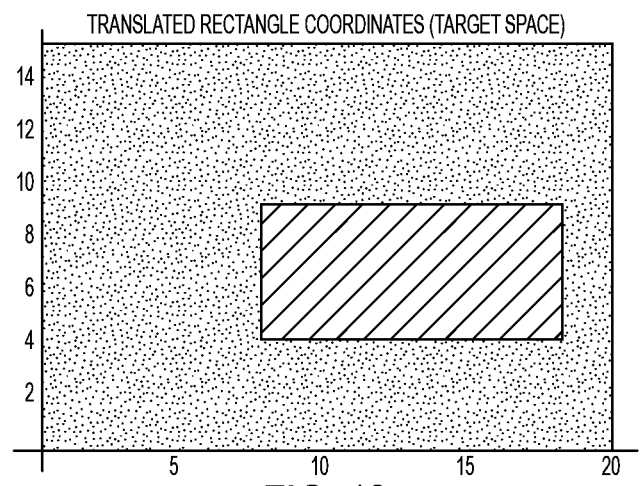
FIGS. 19-20 are plots computed by a mathematical model of the flow of FIG. 6 on the system of FIG. 7 for a translation embodiment.

FIGS. 18-19 are a series of plots computed by a mathematical model of the flow of FIG. 6 on the system of FIG. 8 for a translation embodiment.

As with the Mathematica scaling embodiment above, this example uses translate in 3D with z=0, same as before.

Translation. Will shift original rectangle in source coordinate space.

sourceTranslationMatrix3D=translate3D[2, 4, 0];
    sourceTranslatedRectangleCoordinates3D=Transpose [sourceTranslationMatrix3D·Transpose [sourceRectangleCoordinates3D]];
    showFrames[sourceTranslatedRectangleCoordinates3D, sourceCCM3D, sourceFrameCoordinates3D, sourceCCM3D, "Translated rectangle coordinates (source space)"];

The translated rectangle in source space is shown in FIG. 18. This is an arbitrary shift moving away from the lower right origin.

Next the shift vector from the original origin and offset, to anchoring it to zero in the target subspace but now the magnitude sign is corrected (one is positive in one space can be negative in another depending upon axis direction differences). Stated differently, the vector by definition consists of a magnitude and direction. The location of the vector is not important. So rather than shifting from the source origin, whose coordinates may not be canonical, this finds the shift/translation vector in the target space and relative to the target origin/axes. Other approaches that yield the same results are possible.

targetTranslationVector3D=Append[Take[(CCM3D· {2,4,0,1})−(CCM3D·{0,0,0,1}), 3], 1];

This creates a translation matrix based on new target translation vector.

targetTranslationMatrix3D=translate3D [targetTranslationVector3D[[1]], targetTranslationVector3D[[2]], targetTranslationVector3D[[3]]];

Perform translation matrix operation in target space.

targetTranslatedRectangleCoordinates3D=Transpose [targetTranslationMatrix3D·Transpose[Transpose [CCM3D·Transpose [sourceRectangleCoordinates3D]]]];

The translated rectangle in source space is shown in FIG. 19. Although this visually identical FIG. 18, notice the spaces are target spaces in showFrames whereas they were source spaces in the earlier operation. Lastly, although not shown would be a clipToFrame operation (if needed) as shown above for the Mathematic scaling embodiment.

showFrames[targetTranslatedRectangleCoordinates3D, targetCCM3D, targetFrameCoordinates3D, targetCCM3D, "Translated rectangle coordinates (target space)"];

Rotation—Mathematica Embodiment

FIGS. 20-26 are a series of plots computed by a Mathematical model of the flow of FIG. 6 on the system of FIG. 8 for a rotation embodiment.

Figure 20:
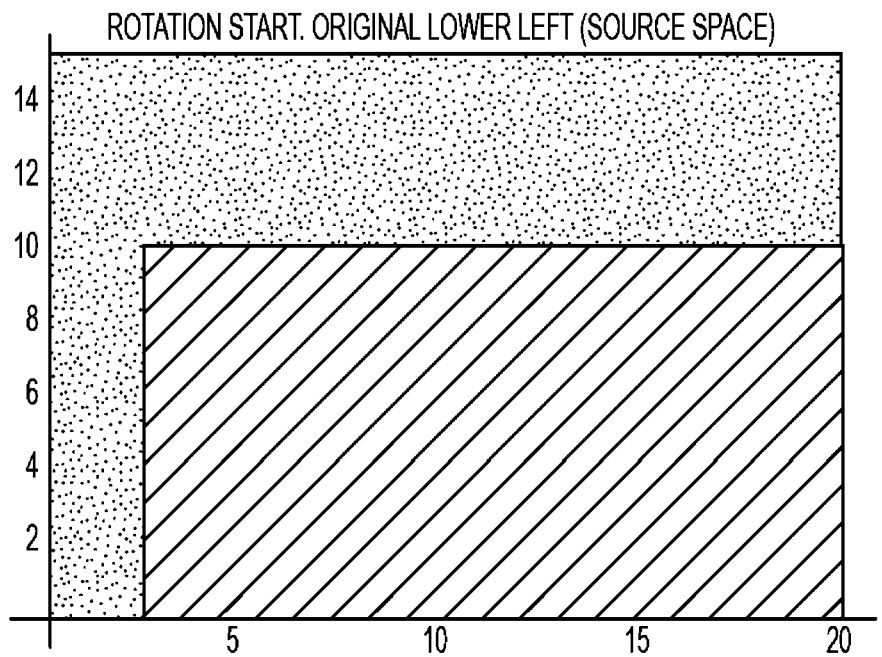
Figure 21:
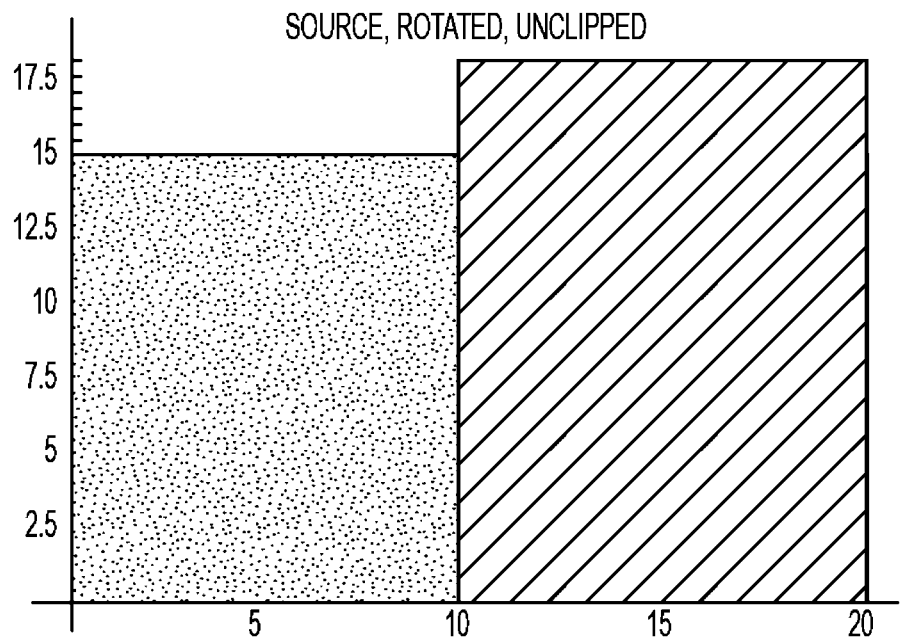
FIGS. 21-26 are plots computed by a mathematical model of the flow of FIG. 6 on the system of FIG. 7 for a rotation embodiment.

In this example, the rotation angle is set to rotationAngle=Pi/2 radians (equivalent to 180 degrees). The original rectangle in source space is shown in FIG. 20 sourceRectangleCoordinates3D={{0,0,0,1}, {18,0,0,1}, {0,10,0,1}, {18,10,0,1}};
 showFrames[sourceRectangleCoordinates3D, sourceCCM3D, sourceFrameCoordinates3D, sourceCCM3D, "Rotation start. Original lower left (source space)"];
 sourceRotatedRectangleCoordinates3D=cornerRotate [sourceRectangleCoordinates3D, {0,0,0,1}, rotationAngle];
 showFrames[sourceRotatedRectangleCoordinates3D, sourceCCM3D, sourceFrameCoordinates3D, sourceCCM3D, "source, rotated, unclipped)"];

The original rectangle in shown rotated and unclipped in FIG. 21 in source space. In this example the image rotates off the frame. It is important to point out that rotation of a raster image, is not like rotating an image in a Cartesian coordinate space. Notice function "cornerRotate". Unlike a rotation in Microsoft® Paint, or the Microsoft Picture viewer, rotation leaves the image anchored to the origin in essentially the first quadrant. For example a rotation of Pi/4 radians (equivalent to 90 degrees) would move the image from the $1^{st}$ to the $2^{nd}$ quadrants in a Cartesian coordinate space. This rotation about a corner is an important distinction.

The overall process continues using the same flow of clipping, inverse, mapping to new coordinate space, translating to position as was described above for the Mathematica Scaling example.

Figure 22:
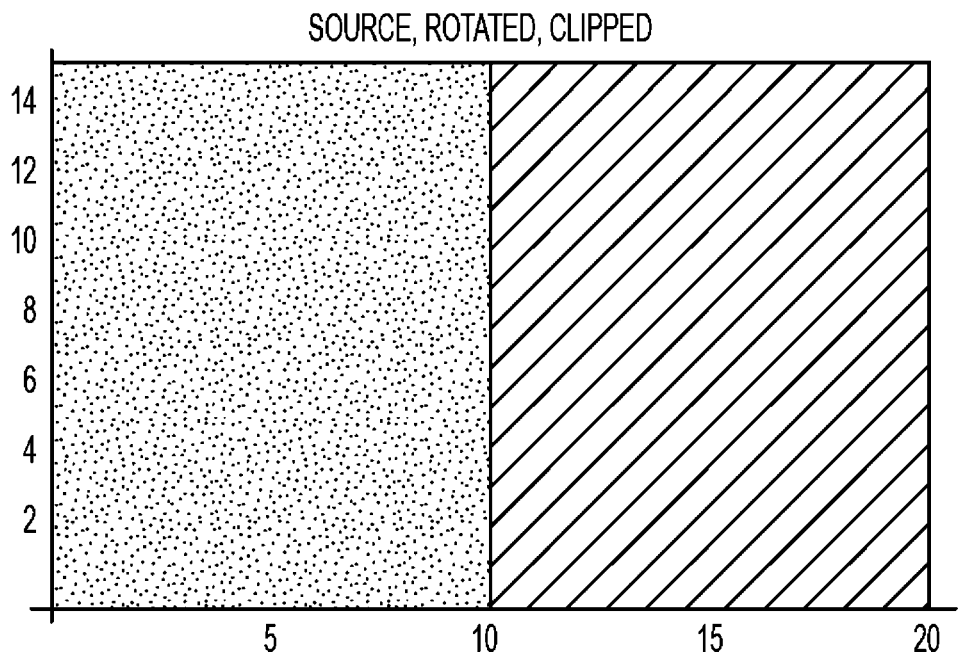

(* Now clip to frame *)
 sourceClippedRotatedRectangleCoordinates3D=clip RectangleCoordinatesToFrame [sourceRotatedRectangleCoordinates3D, sourceFrameCoordinates3D];
 showFrames [sourceClippedRotatedRectangleCoordinates3D, sourceCCM3D, sourceFrameCoordinates3D, sourceCCM3D, "source, rotated, clipped"];

Shown in FIG. 22 is the image that is rotated and clipped to the frame.

Now rotate back to see where we need to do an ACTUAL clip (vs. clipping coordinates).

Figure 23:
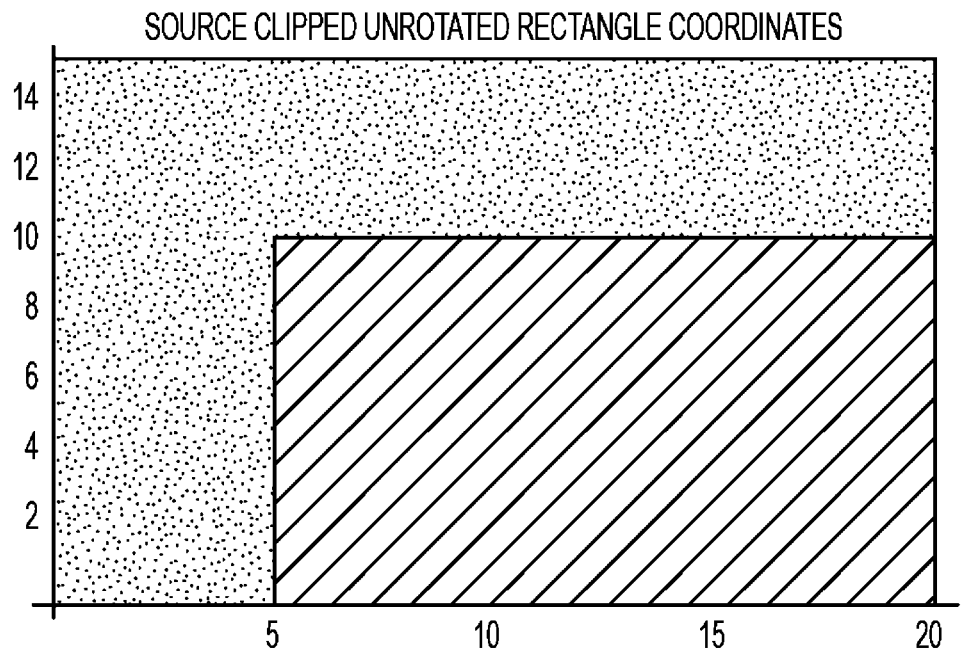
Figure 24:
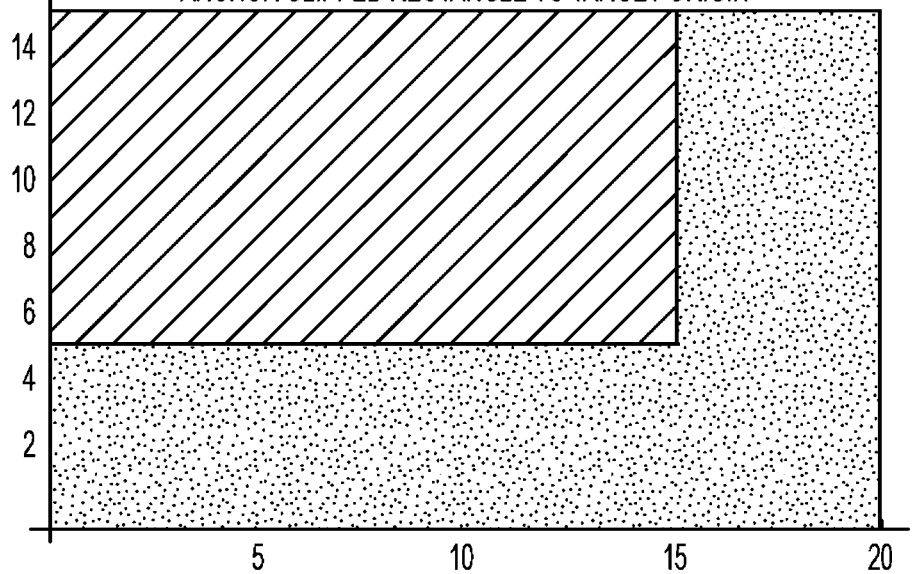

(This is the Inverse operation that we do also with scaling)
 sourceClippedUnrotatedRectangleCoordinates3D=corner Rotate [sourceClippedRotatedRectangleCoordinates3D, {0,0,0, 1}, -rotationAngle];
 showFrames [sourceClippedUnrotatedRectangleCoordinates3D, sourceCCM3D, sourceFrameCoordinates3D, sourceCCM3D, "sourceClippedUnrotatedRectangleCoordinates"];

Shown in FIG. 23 is the image that is rotated back i.e. unrotated and clipped.

(* Translate clip coordinates into target coordinate space. Feed these coordinates to Image Processor to do actual image clip *)
 targetClippedUnrotatedRectangleCoordinates3D= Transpose[CCM3D·Transpose [sourceClippedUnrotatedRectangleCoordinates3D]];
 targetClippedRotatedRectangleCoordinates3D= Transpose[CCM3D·Transpose [sourceClippedRotatedRectangleCoordinates3D]];

Making this look like a clipped image which will be anchored to target origin.

targetClippedRotatedTranslationVector3D=Flatten[get-ClosestCoordinate[targetClipped Rotated RectangleCoordinates3D], 1];
 targetClippedUnrotatedTranslationVector3D=Flatten[get-ClosestCoordinate [targetClippedUnrotatedRectangleCoordinates3D], 1];

Show in FIG. 23 is the image that is rotated back i.e. unrotated and clipped. This unrotated image is used for clipping. However, the final translation has to be to where it looks after rotation in source space. So we in effect need two translation vectors. The unrotated image is really only needed to show/emulate anchoring clipped image to target origin. In practice the rotated image will be used since the anchoring emulation isn't necessary because it happens by actual image clipping. It is only here to demonstrate the validity of the modeling in Mathematica.

Figure 25:
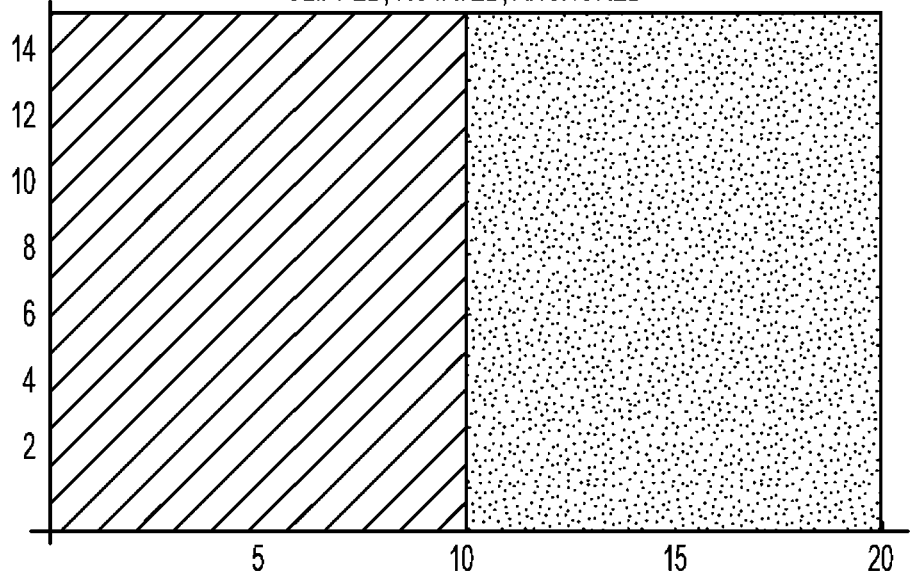
Figure 26:
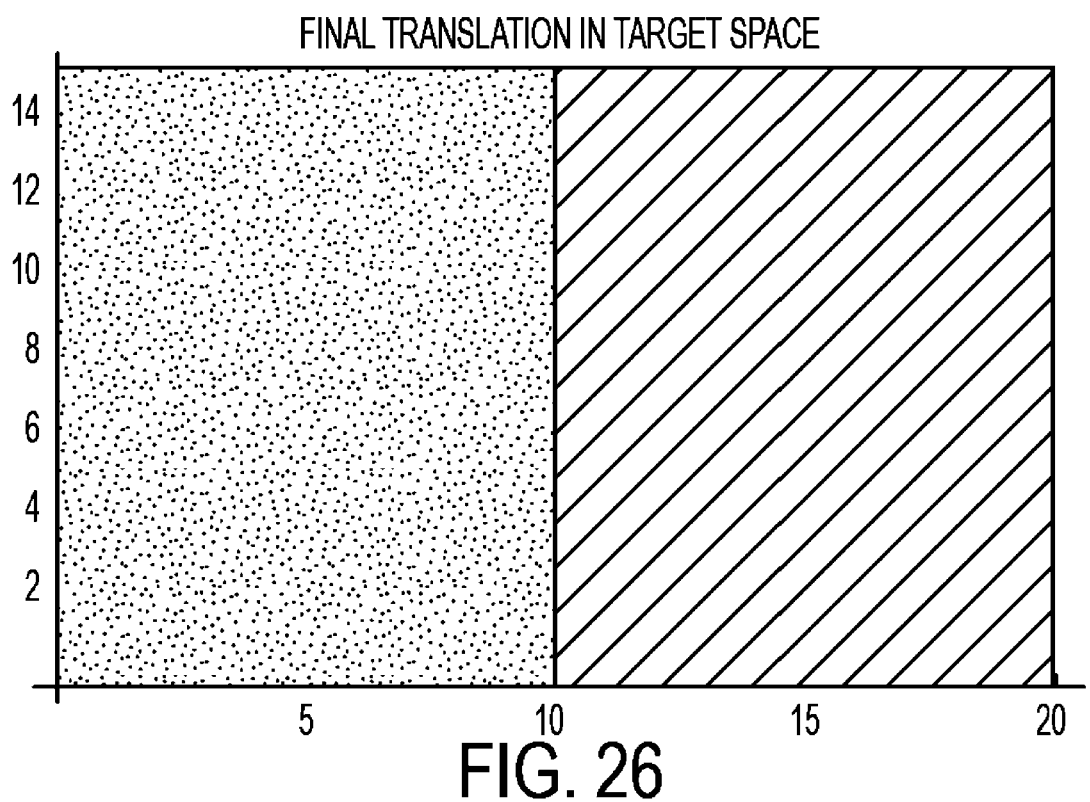

Here the translation vector is subtracted off by doing a translation back to origin of all points.

targetAnchoredClippedUnrotatedRectangleCoordinates 3D=Transpose [translate3D[-targetClippedUnrotatedTranslationVector3D[[1]], -targetClippedUnrotatedTranslationVector3D[[2]], 0]·Transpose [targetClippedUnrotatedRectangleCoordinates3D]];

Using this information we now know how to map the clipped coordinates from the original position to the new origin (anchor to origin, for demo purposes).

showFrames[targetAnchoredClippedUnrotatedRectangle Coordinates3D, targetCCM3D, targetFrameCoordinates3D, targetCCM3D, "Anchor clipped rectangle to target origin"];

As shown in FIG. 25. the box is clipped, rotated, and anchored in the new coordinate space at the new origin. In this example, the clipped rectangle is rotating, but rotation is happening in target space. Notice that it fits the same as earlier, but the rectangular hashed area is now anchored to the upper left origin of the frame as shown illustrated with a stippling pattern.

targetRotatedRectangleCoordinates3D=cornerRotate[targetAnchoredClippedUnrotatedRectangleCoordinates 3D, {0,0,0,1}, rotationAngle];
 showFrames[targetRotatedRectangleCoordinates3D, targetCCM3D, targetFrameCoordinates3D, targetCCM3D, "Clipped, rotated, anchored"];

Shown in FIG. 26 is the box that is shifted to a final place in target space. This box should look as it did in source space. The box is positioned correctly i.e. the same place it would end up as viewed in the original source space. This is where the other (rotated, versus unrotated) translation vector comes in play. In this case, the translation vector represents a move to the right so it ends up where the original did. It is important to note with different source and target frame sizes and relations, such as a smaller and shifted target space that doesn't perfectly overlap, the results of this translation (and other operations) would result in different visual behaviors that are not shown.

targetTranslatedClippedRotatedRectangleCoordinates 3D=Transpose [translate3D [targetClippedRotatedTranslationVector3D[[1]], targetClippedRotatedTranslationVector3D[[2]], 0]·Transpose[targetRotatedRectangleCoordinates3D]];
    showFrames[targetTranslatedClippedRotatedRectangle Coordinat-es3D, targetCCM3D, targetFrameCoordinates 3D, targetCCM3D, "Final translation in target space"];

To recapitulate, the flow is to abstractly perform an OPERATION. We note the offset for later/final positioning. Next the process continues with a clip to frame then perform an inverse of the OPERATION to determine clipping window. Next the clipping window is mapped into target coordinates and clip. The operation is performed in target space, and then the resulting image is positioned correctly.

Order of Operation (OOO)—Mathematica Embodiment

The following code is a demonstration for decomposition to reorder. For simplicity, the focus will only on the reordering in the source space. However, it should be understood to those of average skill in the art, that the other techniques are used to map from source space to the target space or to work within a target space.

Figure 27:
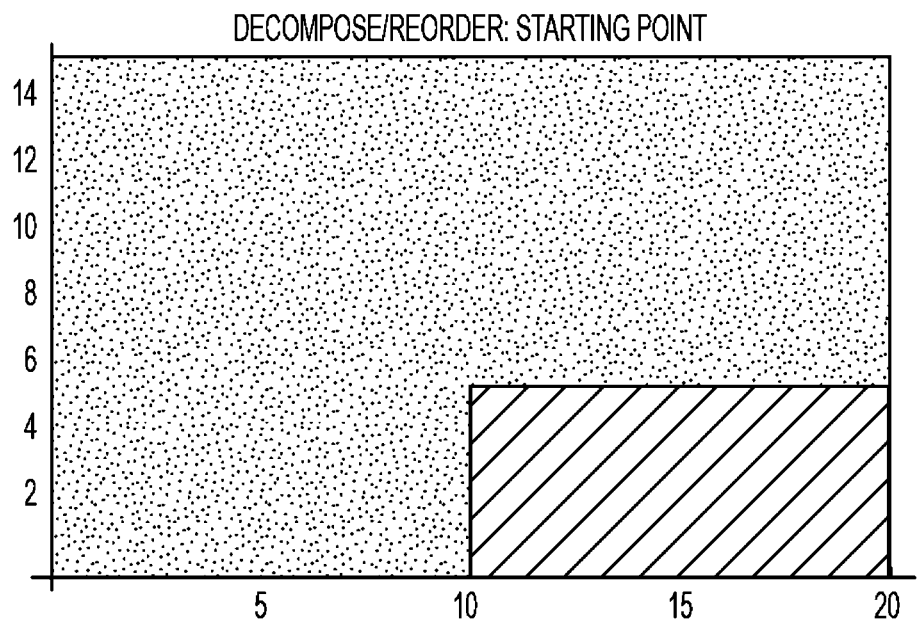
FIGS. 27-38 are plots computed by a mathematical model illustrating reordering of operations in source space.
Figure 28:
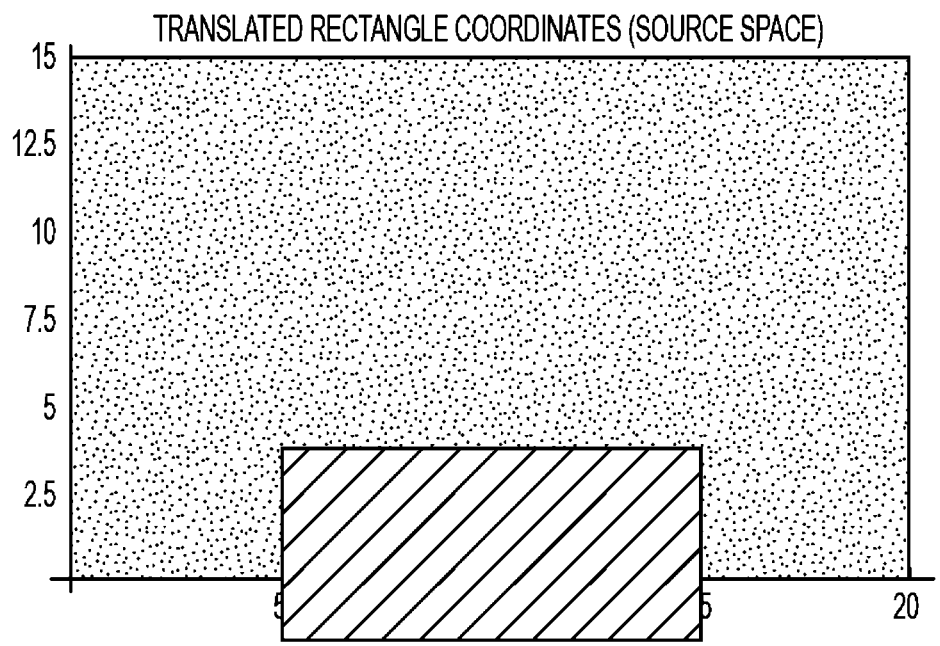
Figure 29:
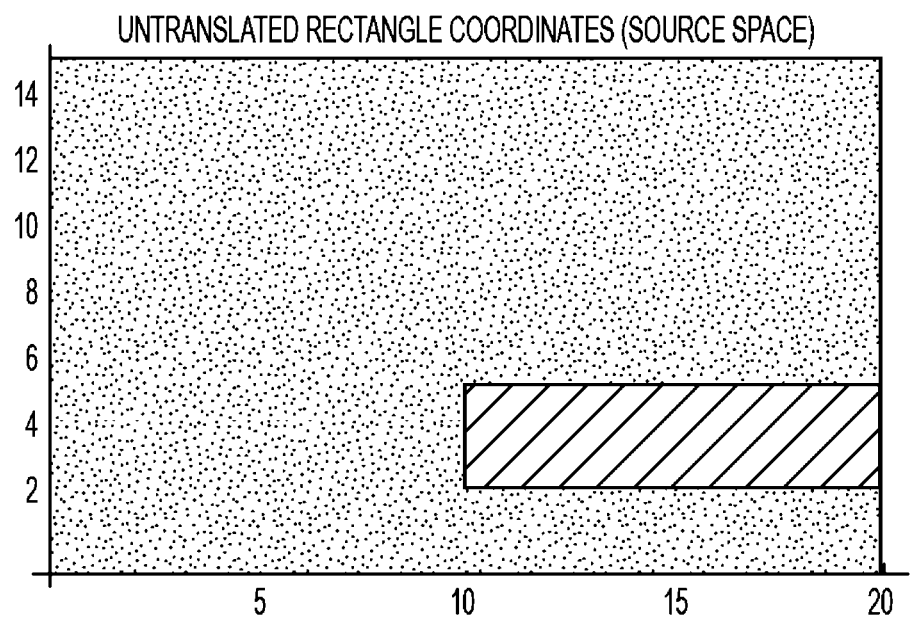
Figure 30:
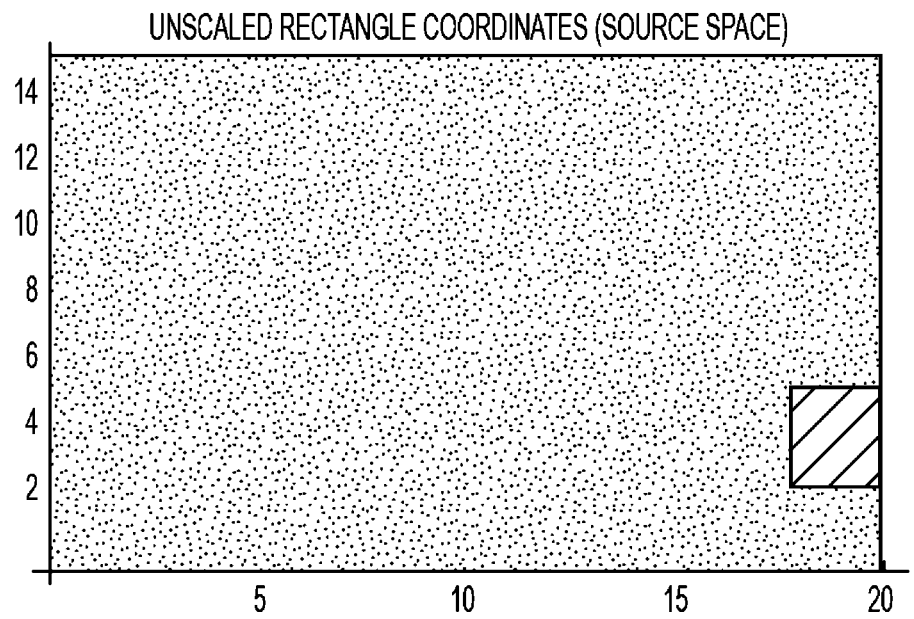
Figure 31:
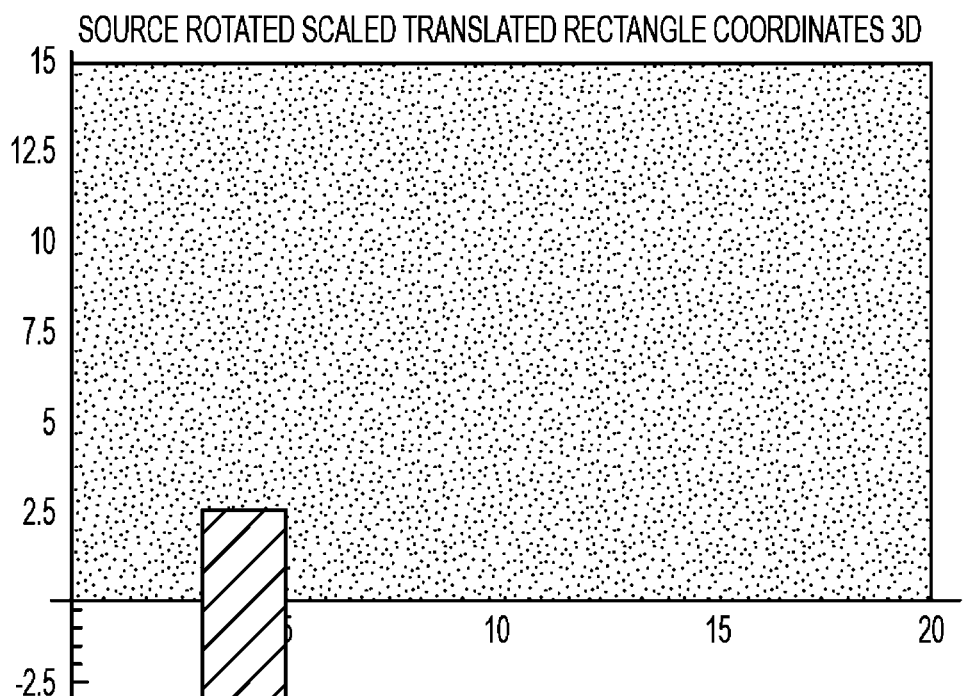

To begin, an order of operation is arbitrarily selected. In this example RST (Rotate-Scale-Translate) is chosen. Note that due to right→left ordering the operations are ordered as translate, then scale, then rotate. Decomposition is used to produce a second ordering and the results of the two orderings are compared. The second ordering is TSR (Translate-Scale-Rotate) which is the reversal of operations: rotate, then scale, then translate.

rRST3D=zRotate3D[Pi/2];
    sRST3D=scale3D[3, ½, 1];
    tRST3D=translate3D[5, −2, 0];
    RST3D=rRST3D·sRST3D·tRST3D;
    {tTSR2D, sTSR2D, rTSR2D}=tsrDecompose2D [affineMatrix3Dto2D[RST3D]];
    tTSR3D=affineMatrix2Dto3D[tTSR2D];
    sTSR3D=affineMatrix2Dto3D[sTSR2D];
    rTSR3D=affineMatrix2Dto3D[rTSR2D];
    TSR3D=tTSR3D·sTSR3D·rTSR3D;

Using modeling first, the operations are performed and then inverse is used to produce the starting cropped window. As illustrated in FIG. 27, an arbitrary rectangle is defined and a coordinate space is arbitrary selected with the origin in the lower right.

sourceRectangleCoordinates3D={{0, 0, 0, 1}, {10, 0, 0, 1}, {0, 5, 0, 1}, {10, 5, 0, 1}};
    Display the starting point.
    showFrames[sourceRectangleCoordinates3D, sourceCCM3D, sourceFrameCoordinates3D, sourceCCM3D, "Decompose/reorder: starting point"];
    TRANSLATE—A Translation shifts the original rectangle in source coordinate space. This is shown in FIG. 28.
    sourceTranslationMatrix3D=tRST3D;
    sourceTranslatedRectangleCoordinates3D=Transpose [sourceTranslationMatrix3D. Transpose [sourceRectangleCoordinates3D]];
    showFrames[sourceTranslatedRectangleCoordinates3D, sourceCCM3D, sourceFrameCoordinates3D, sourceCCM3D, "Translated rectangle coordinates (source space)"];

Next, the operations of clip to frame and inverse the translation are performed in order to move back to starting point. This is shown in FIG. 29.

sourceClippedTranslatedRectangleCoordinates3D=clip RectangleCoordinatesToFrame[sourceTranslated RectangleCoordinates3D, sourceFrameCoordinates3D];
    sourceUntranslatedClippedTranslatedRectangle Coordinates3D=Transpose[Inverse [sourceTranslationMatrix3D]·Transpose [sourceClippedTranslatedRectangleCoordinates3D]];
    showFrames[sourceUntranslatedClippedTranslated RectangleCoordinates3D, sourceCCM3D, sourceFrameCoordinates3D, sourceCCM3D, "Untranslated rectangle coordinates (source space)"];

SCALE—Since this is RST and the order is right left, then scaling is next. But note, in this example the new window that was translated, clipped to frame, and untranslated is scaled. This is shown in FIG. 30.

sourceScalingMatrix3D=sRST3D;
    sourceScaledTranslatedCoordinates3D=Transpose [sourceScalingMatrix3D·Transpose[source-ClippedTranslated RectangleCoordinates3D]];
    sourceClippedScaledTranslatedCoordinates3D=clip RectangleCoordinatesToFrame [sourceScaledTranslatedCoordinates3D, sourceFrameCoordinates3D];
    sourceUnscaledUntranslatedClippedScaledCoordinates 3D=Transpose[Inverse [sourceScalingMatrix3D·sourceTranslationMatrix3D] ·Transpose [sourceClippedScaledTranslatedCoordinates3D]];
    showFrames[sourceUnscaledUntranslatedClippedScaled Coordinates3D, sourceCCM3D, sourceFrameCoordinates3D,sourceCCM3D, "Unscaled rectangle coordinates (source space)"];

ROTATE—Rotate but don't clip. In source space. This is shown in FIG. 31.

rotationAngle=Pi/2;
    {lowerLeft, upperLeft, lowerRight, upperRight}=getCorners [sourceClippedScaledTranslatedCoordinates3D];
    sourceRotatedScaledTranslatedRectangleCoordinates 3D=cornerRotate [sourceClippedScaledTranslatedCoordinates3D, lowerRight, rotationAngle];
    showFrames[sourceRotatedScaledTranslatedRectangleCoordinates 3D, sourceCCM3D, sourceFrameCoordinates3D, sourceCCM3D, "sourceRotatedScaledTranslatedRectangleCoordinates 3D"];

Note that this uses the previously mentioned special rotation function (cornerRotate) that will orthogonally rotate and align to a specified corner. This is distinctly different than a rotation typically done using computer graphics and is designed to work with frame-based coordinate spaces and emulates actual behavior seen with raster (versus vector) graphics and is an important capability used during the modeling phase.

Figure 32:
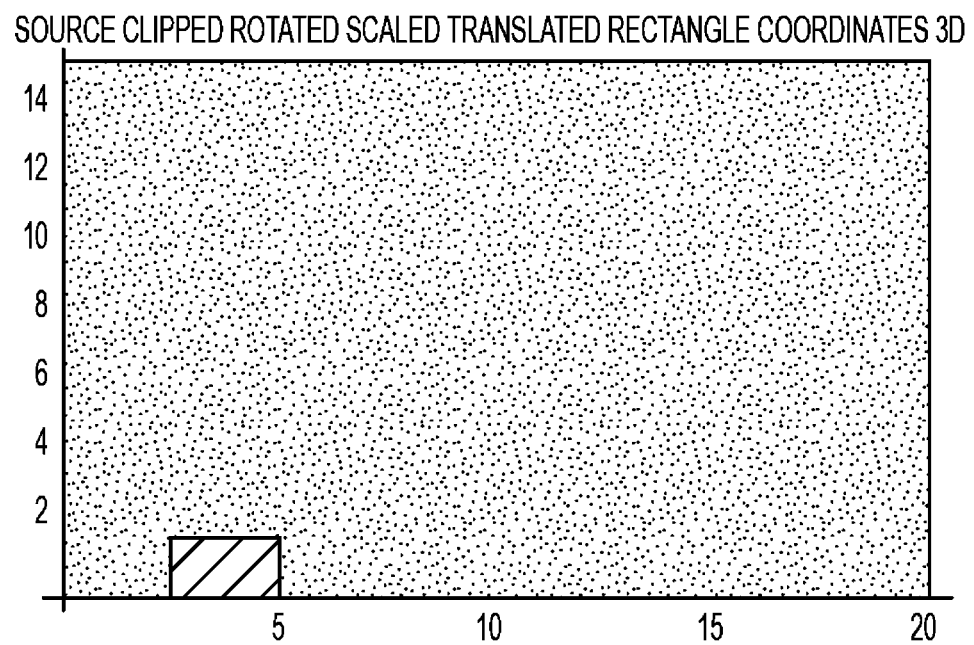

Next to clip to frame as shown in FIG. 32.

sourceClippedRotatedScaledTranslatedRectangle Coordinates3D=clipRectangleCoordinatesToFrame [sourceRotatedScaledTranslatedRectangleCoordinates 3D, sourceFrameCoordinates3D];
    showFrames[sourceClippedRotated-ScaledTranslatedRectangle Coordinates3D, sourceCCM3D, sourceFrameCoordinates3D, sourceCCM3D, "sourceClippedRotatedScaledTranslatedRectangle Coordinates3D"];

FIG. 32 above would be the desired final state of the 3 operations. This is what we hope to show with the new order of operation. That is, obtaining the exact same results using a different ordering.

Figure 33:
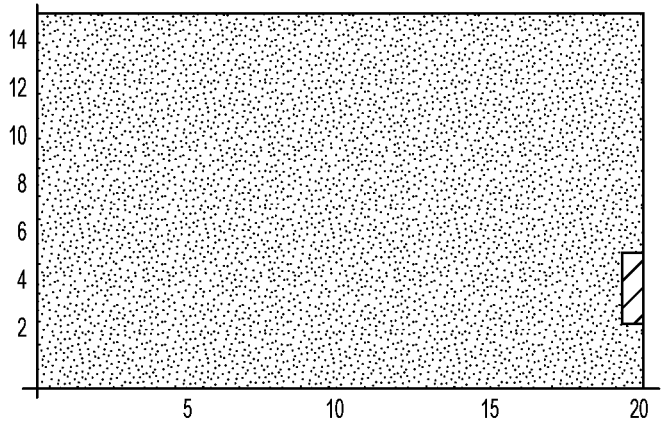

Next an ACTUAL clip (vs. clipping coordinates) is performed. The new corners values are calculated. This is shown in FIG. 33.

{lowerLeft, upperLeft, lowerRight, upperRight}=getCorners[sourceClippedRotatedScaledTranslatedRectangle Coordinates3D];
sourceClippedUnrotatedUnscaledUntranslatedRectangle Coordinates3D=Transpose[Inverse [sourceScalingMatrix3D·sourceTranslationMatrix3D] ·Transpose[cornerRotate[sourceClippedRotatedScaledTranslatedRectangle Coordinates3D, lowerRight, -rotationAngle]]];
showFrames[sourceClippedUnrotatedUnscaledUntranslated RectangleCoordinates3D, sourceCCM3D, sourceFrameCoordinates3D, sourceCCM3D, "sourceClippedUnrotatedUnscaledUntranslated RectangleCoordinates3D"];

Returning to the starting rectangle for further operations. As a validation the steps are repeated with this special rectangle. The should result in the identical final result. This is done with the same original order of operation, but not with the original rectangle, instead using the new rectangle.

Figure 34:
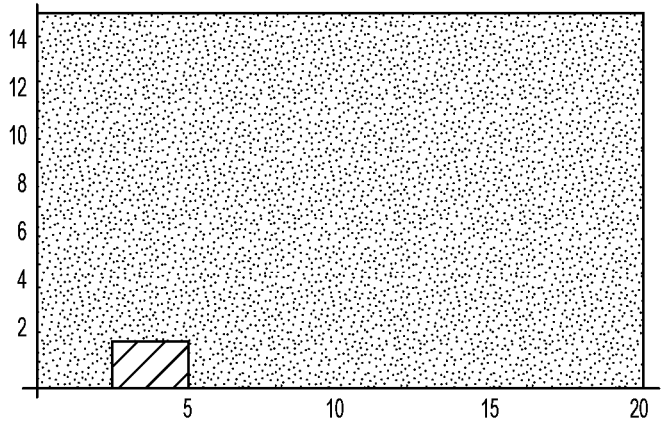

Now test the actions by combining the first two steps via matrix multiplication, the applying rotation via function to latest window. This will allow mapping/clipping to target coordinate space. It is important to note that there is no need to illustrate this mapping since the focus is on changing order of operation, but it is an important step for full solution. This is shown in FIG. 34.

sourceScaledTranslatedRectangleCoordinates3D= Transpose[sourceScalingMatrix3D·sourceTranslation Matrix3D·Transpose[sourceClippedUnrotated UnscaledUntranslatedRectangleCoordinates3D]];

Find corner again. This is a different rectangle and must getCorners on new points. See FIG. 34.

{lowerLeft, upperLeft, lowerRight, upperRight}=getCorners [sourceScaledTranslatedRectangleCoordinates3D];
sourceRotatedScaledTranslatedRectangleCoordinates 3D=cornerRotate [sourceScaledTranslatedRectangleCoordinates3D, lowerRight, rotationAngle];
showFrames [sourceRotatedScaledTranslatedRectangleCoordinates3D, sourceCCM3D, sourceFrameCoordinates3D, sourceCCM3D, "sourceRotatedScaledTranslated Rectangle Coordinates3D"];

From the above, the expected final results are achieved. This validates the new starting rectangle is correct. In essence, the new order of operation will work with the new rectangle as if it were a clipped image. This same concept applicable when applying this to target space. The technique separates translation from rotation and scaling. The offset for the final positioning is captured and used after any scaling or rotation operation. Both operations are performed in this example and the order is changed by decomposition. Note that this offset is in source space and would be transformed as before into target space for the full implementation. This is shown in FIG. 34.

The final offset for the order-of-operation final placement is saved for subsequent use below.

savedOffset=Flatten[getClosestCoordinate [sourceRotatedScaledTranslatedRectangleCoordinates 3D], 1];

To this point a series of operations in a given order has been performed/executed. Now we want to use the new, decomposed order from above.

Now changing the order of operation, it was RST (reading right→left), so translate, then scale, then rotate. Using TSR, we now rotate, then scale, then translate.

Use decomposed matrices from above for new order located at the beginning.

Note that actual clipped images become anchored to the origin. So we will take the starting rectangle and move it there.

Figure 35:
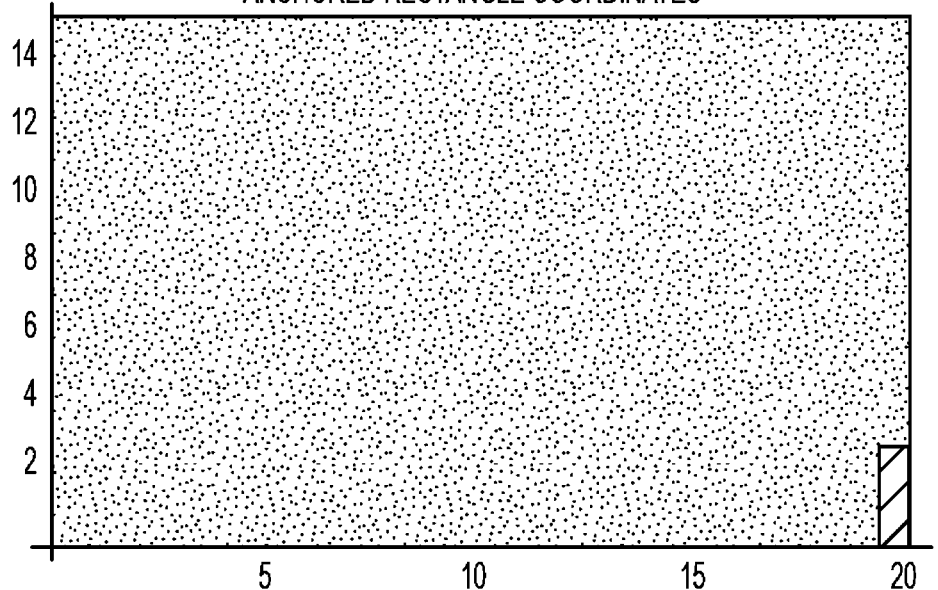

A special "anchor" function is created to move rectangles back to the origin. In a real implementation, by virtue of clipping you'd have an anchored image and scaling and rotation would leave it anchored to the origin. This simulation is done to prove the operations work correctly. This is shown FIG. 35

Figure 36:
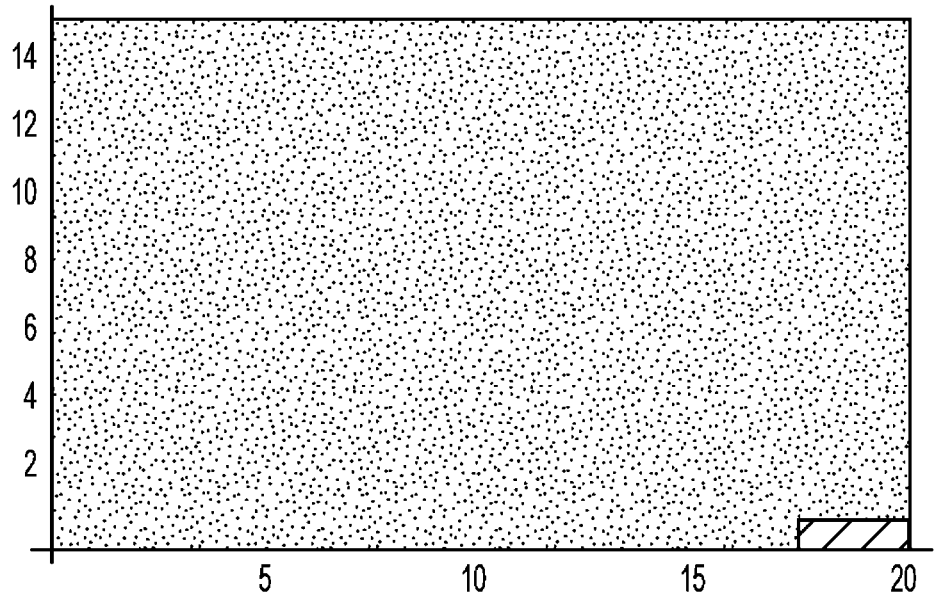

The next step moves the new rectangle to the origin. Again, this would happen implicitly when an actual image is clipped.

anchoredRectangleCoordinates=anchorRectangleTo Origin[sourceClippedUnrotatedUnscaledUntranslated RectangleCoordinates3D];
showFrames[anchoredRectangleCoordinates, sourceCCM3D, sourceFrameCoordinates3D, sourceCCM3D, "anchoredRectangleCoordinates"];

As shown in FIG. 36, now rotate, anchor, show:
rotatedRectangleCoordinates=Transpose [rTSR3D·Transpose[anchoredRectangleCoordinates]];
anchoredRotatedRectangleCoordinates=anchorRectangle ToOrigin[rotatedRectangleCoordinates];
showFrames[anchoredRotatedRectangleCoordinates, sourceCCM3D, sourceFrameCoordinates3D, sourceCCM3D, "anchoredRotatedRectangleCoordinates"];

Note that while the special corner rotation function may be used, here we do a pure computer graphics rotation via the rTSR3D matrix as an alternative approach. This works because the anchor function returns the rotated object to the origin.

Note we are starting with rotation as the first step in the new ordering.

Figure 37:
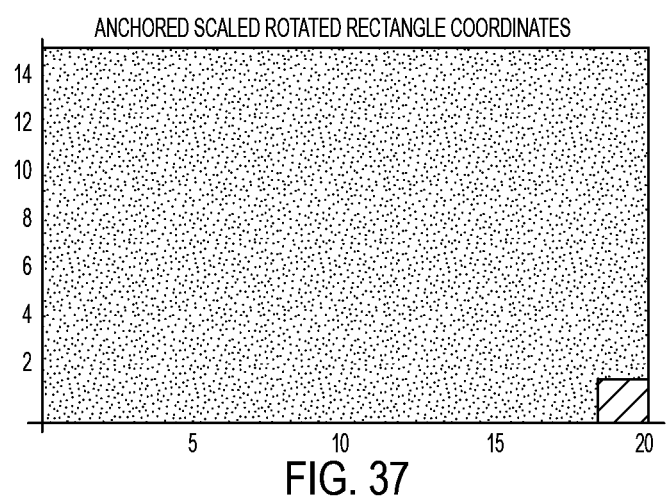

Now scale, anchor, show as illustrated in FIG. 37.
scaledRotatedRectangleCoordinates=Transpose [sTSR3D·Transpose[anchoredRotatedRectangleCoordinates]];
anchoredScaledRotatedRectangleCoordinates=anchor RectangleToOrigin[scaledRotatedRectangleCoordinates];
showFrames[anchoredScaledRotatedRectangleCoordinates, sourceCCM3D, sourceFrameCoordinates3D, sourceCCM3D, "anchoredScaledRotatedRectangleCoordinates"];

As a result, it is the same size as the desired final output in the original ordering, just not yet correctly placed.

Figure 38:
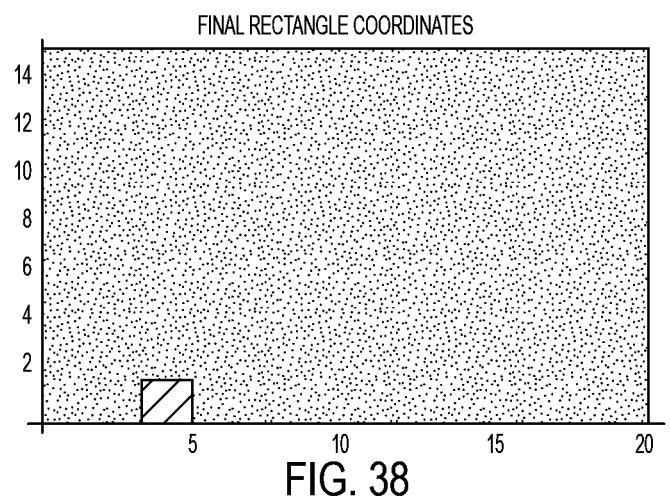

Now move to final location as shown in FIG. 38 using the previously save offset finalRectangleCoordinates=Transpose[translate3D[savedOffset[[1]], savedOffset[[2]], 0]·Transpose[anchoredScaledRotatedRectangleCoordinates]];
showFrames[finalRectangleCoordinates, sourceCCM3D, sourceFrameCoordinates3D, sourceCCM3D, "finalRectangleCoordinates"];

The new output, with new ordering matches the original in FIG. 38.

As a final check we will look at the coordinates of the original and new final rectangle:

In[426]:=Sort[finalRectangleCoordinates]
Out[426]={{15, 0, 0, 1}, {15, 3/2, 0, 1}, {33/2, 0, 0, 1}, {33/2, 3/2, 0, 1}}
In[427]:=Sort[sourceRotatedScaledTranslatedRectangleCoordinates 3D]
Out[427]={{15, 0, 0, 1}, {15, 3/2, 0, 1}, {33/2, 0, 0, 1}, {33/2, 3/2, 0, 1}}

The new coordinates are identical to the original.
Anchor rectangle function
anchorRectangleToOrigin[rectanglePoints_]:=Module
  [{anchored RectangleCoordinates},
  anchoredRectangleCoordinates=Transpose
    [translate3D[-Min[rectanglePoints[[All, 1]]], -Min[rectanglePoints[[All, 2]]], 0]·
    Transpose[rectanglePoints]];
  (* Return coordinates of anchored rectangle. *)
  Return[anchored RectangleCoordinates];]

Other Variations

It should be understood that the flow diagrams depicted herein are illustrative. One or more of the operations illustrated in any of the flow diagrams may be performed in a differing order. Other operations, for example, may be added, modified, enhanced, condensed, integrated, or consolidated. Variations thereof are envisioned and are intended to fall within the scope of the appended claims.

It should also be understood that the method described in the flowcharts provided herewith can be implemented on a special purpose computer, a micro-processor or micro-controller, an ASIC or other integrated circuit, a DSP, an electronic circuit such as a discrete element circuit, a programmable device such as a PLD, PLA, FPGA, PAL, PDA, GPU, GP-GPU and the like. In general, any device capable of implementing a finite state machine that is in turn capable of implementing one or more elements of the flow diagrams provided herewith, or portions thereof, can be used. Portions of the flow diagrams may also be implemented partially or fully in hardware in conjunction with machine executable instructions.

Furthermore, the flow diagrams hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows/.NET and supported software development languages, Java, or from a server or hardware accelerator or other image processing devices.

The teachings hereof can be implemented in hardware or software using any known or later developed systems, structures, devices, and/or software by those skilled in the applicable art without undue experimentation from the functional description provided herein with a general knowledge of the relevant arts.

Moreover, the methods hereof may be readily implemented as software executed on a programmed general purpose computer, a special purpose computer, a microprocessor, or the like. In this case, the methods hereof can be implemented as a routine embedded on a personal computer or as a resource residing on a server or workstation, such as a routine embedded in a plug-in, a photocopier, a driver, a scanner, a photographic system, a xerographic device, or the like. The methods provided herein can also be implemented by physical incorporation into an image processing or color management system.

Non-imaging embodiments are possible. For example, a purely mechanical system that aligns a sheet to a finisher, cutter, hole punch, or similar device. The positioning subsystem in two devices could use different coordinate spaces, and determining the correct sheet rotation and placement coordinates could be emulated.

It will be appreciated that various of the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications are each separately hereby incorporated by reference in their entirety.

What is claimed is:

1. A method for transforming image data in an imaging device, the method comprising:

defining a source coordinate space with an origin and at least two axes for a source system;

receiving at least one of i) coordinates, and ii) dimensions and locations of each of a source foreground object and a source background frame object;

receiving a target coordinate space with an origin and at least two axes for a target system;

selecting a mapping using at least one Coordinate Change Matrix for mapping between the source coordinate space and the target coordinate space;

applying a transformation to modify said source foreground object relative to said source coordinate space to create transformed source foreground object coordinates;

capturing said source foreground object coordinates to obtain said foreground object final positioning offset and transform object offset via said Coordinate Change Matrix mapping to a target foreground object offset;

clipping said transformed source foreground object coordinates to said coordinates of said source frame object to create clipped transformed source foreground object coordinates;

applying an inverse transformation to said clipped transformed source foreground object coordinates to create a source clipping rectangle; and mapping said source clipping rectangle and the source background frame object using said Coordinate Change Matrix, to said target coordinates to create a target clipping rectangle and a target frame object in said target coordinate space.

2. The method of claim 1, further comprising:
clipping actual image data using target clipping rectangle in a target system;
applying an original transformation the actual image data; in the target system; and
placing the actual image data which has been clipped using the transformed foreground object coordinates and the transformed positioning offset.

3. The method of claim 1, wherein applying said transformation to modify said source foreground object relative to said source coordinate space further comprises any of:

applying a scaling matrix with scaling factors to scale the coordinates of the source foreground object relative to the source coordinate space to create transformed source foreground object coordinates which have been scaled;

applying a rotation matrix with rotation factors to rotate the coordinates of the source foreground object relative to the source coordinate space to create transformed source foreground object coordinates which have been rotated; and applying at least one of:
  a translation matrix with translation factors to translate the coordinates of the source foreground object relative to the source coordinate space to create transformed source foreground object coordinates which have been translated; and
  a reflecting matrix with reflecting factors to reflect the coordinates of the source foreground object relative to the source coordinate space to create transformed source foreground object coordinates which have been reflected.

4. The method of claim 1, wherein said source foreground object comprises any of: a rectangular region, an electronic image, an imageable substrate, a scanner, a raster output system, a display device, and an imaging processing card, and wherein said source background frame object comprises any of: a rectangular region, an electronic image, an imageable substrate, a scanner, a raster output system, a display device, a paper path, a finisher, and an imaging processing card.

5. The method of claim 1, further comprising:
  identifying at least one composite transformation matrix to carry said transformation, said transformation including at least one transformation of any of: translation, rotation, scaling, and shear; and
  applying said identified at least one composite transformation matrix in at least one sub-system in an imaging device.

6. The method of claim 5, further comprising any of:
  receiving at least one of a job program and a site policy for said transformations as part of an image path in said imaging device;
  receiving at least one emulation of a specific hardware in an image path for said transformation, wherein said imaging device is a printing device; and
  receiving at least one emulation of specific hardware in a scan path for said transformation, wherein said imaging device is an image capture device.

7. The method of claim 5, wherein said at least one composite transformation matrix comprises a composite transformation matrix for discrete graphics operations as requested by a user.

8. The method of claim 5, wherein applying said composite transformation matrix in at least one sub-system further comprises any of:
  applying said composite transformation matrix to at least one raster image processor for said transformation as part of a print path of a print system device;
  applying said composite transformation matrix to at least one image processor for said transformation as part of a print path of a print system device;
  applying said composite transformation matrix to at least one of: an imageable substrate registration sub-system, and a xerographic sub-system for said transformation as part of a print path of a print system device;
  applying composite transformation matrix to a combination of at least one of: a raster image processor, an image processor, and a xerographic sub-system for said transformation as part of a print path of a print system device;
  applying said composite transformation matrix to at least one scan processor for the transformation as part of a scan path of an image capture device;
  applying at least one first composite transformation matrix to at least one image processor for said transformation as part of a scan path of an image capture device, and applying at least a second composite transformation matrix to at least one print engine of a print system device;
  applying at least a first composite transformation matrix to a first print engine printing a first color, and applying at least a second composite transformation matrix to a second print engine printing a second color in at least one xerographic sub-system for placement of said first and second colors; and
  applying at least one composite transformation matrix in a print path of the imaging device in at least one of: a raster image processor, an image processor, a printable substrate registration sub-system, and a xerographic sub-system, thereby adjusting distortion and/or placement of the image on any one of a pre-printed form or an electronic form.

9. The method of claim 8, wherein said composite transformation matrix further comprises at least one of: a decomposition operation, and a reordered operation.

10. A system for performing image transformations to control placement of an image in an imaging device, the system comprising:
  a memory;
  a storage medium for storing data; and
  a processor in communication with said storage medium and said memory, said processor executing machine readable instructions for performing the method of:
    defining a source coordinate space with an origin and at least two axis for a source system;
    receiving at least one of: i) coordinates, and ii) dimensions and locations of each of a source foreground object and a source background frame object;
    receiving a target coordinate space with an origin and at least two axis for a target system;
    selecting a mapping using at least one Coordinate Change Matrix for mapping between the source coordinate space and the target coordinate space;
    applying a transformation to modify said source foreground object relative to said source coordinate space to create transformed source foreground object coordinates;
    capturing said source foreground object coordinates to obtain said foreground object final positioning offset and transform object offset via said Coordinate Change Matrix mapping to a target foreground object offset;
    clipping said transformed source foreground object coordinates to said coordinates of said source frame object to create clipped transformed source foreground object coordinates;
    applying an inverse transformation to said clipped transformed source foreground object coordinates to create a source clipping rectangle; and
    mapping said source clipping rectangle and the source background frame object using said Coordinate Change Matrix, to said target coordinates to create a target clipping rectangle and a target frame object in said target coordinate space.

11. The system of claim 10, further comprising:
  clipping actual image data using target clipping rectangle in a target system;

applying an Currently Amended transformation the actual image data; in the target system; and placing the actual image data which has been clipped using the transformed foreground object coordinates and the transformed positioning offset.

12. The system of claim 10, wherein applying said transformation to modify said source foreground object relative to said source coordinate space further comprises any of:

applying a scaling matrix with scaling factors to scale the coordinates of the source foreground object relative to the source coordinate space to create transformed source foreground object coordinates which have been scaled;

applying a rotation matrix with rotation factors to rotate the coordinates of the source foreground object relative to the source coordinate space to create transformed source foreground object coordinates which have been rotated; and applying at least one of:
  a translation matrix with translation factors to translate the coordinates of the source foreground object relative to the source coordinate space to create transformed source foreground object coordinates which have been translated; and
  a reflecting matrix with reflecting factors to reflect the coordinates of the source foreground object relative to the source coordinate space to create transformed source foreground object coordinates which have been reflected.

13. The system of claim 10, wherein said source foreground object comprises any of: a rectangular region, an electronic image, an imageable substrate, a scanner, a raster output system, a display device, and an imaging processing card, and wherein said source background frame object comprises any of: a rectangular region, an electronic image, an imageable substrate, a scanner, a raster output system, a display device, a paper path, a finisher, and an imaging processing card.

14. The system of claim 10, further comprising:
identifying at least one composite transformation matrix to carry said transformation, said transformation including at least one transformation of any of: translation, rotation, scaling, and shear; and
applying said identified at least one composite transformation matrix in at least one sub-system in an imaging device.

15. The system of claim 14, further comprising any of:
receiving at least one of a job program and a site policy for said transformations as part of an image path in said imaging device;
receiving at least one emulation of a specific hardware in an image path for said transformation, wherein said imaging device is a printing device; and
receiving at least one emulation of specific hardware in a scan path for said transformation, wherein said imaging device is an image capture device.

16. The system of claim 14, wherein said at least one composite transformation matrix comprises a composite transformation matrix for discrete graphics operations as requested by a user.

17. The system of claim 14, wherein applying said composite transformation matrix in at least one sub-system further comprises any of:
applying said composite transformation matrix to at least one raster image processor for said transformation as part of a print path of a print system device;
applying said composite transformation matrix to at least one image processor for said transformation as part of a print path of a print system device;
applying said composite transformation matrix to at least one of: an imageable substrate registration sub-system, and a xerographic sub-system for said transformation as part of a print path of a print system device;
applying said composite transformation matrix to a combination of at least one of: a raster image processor, an image processor, and a xerographic sub-system for said transformation as part of a print path of a print system device;
applying said composite transformation matrix to at least one scan processor for the transformation as part of a scan path of an image capture device;
applying at least a first composite transformation matrix to at least one image processor for said transformation as part of a scan path of an image capture device, and applying at least a second composite transformation matrix to at least one print engine of a print system device;
applying at least a first composite transformation matrix to a first print engine printing a first color, and applying at least a second composite transformation matrix to a second print engine printing a second color in at least one xerographic sub-system for placement of said first and second colors; and
applying at least one composite transformation matrix in a print path of the imaging device in at least one of: a raster image processor, an image processor, a printable substrate registration sub-system, and a xerographic sub-system, thereby adjusting distortion and/or placement of the image on any one of a pre-printed form or an electronic form.

18. The system of claim 17, wherein said composite transformation matrix further comprises at least one of: a decomposition operation, and a reordered operation.

* * * * *